(12) United States Patent
Dion et al.

(10) Patent No.: US 8,708,385 B2
(45) Date of Patent: Apr. 29, 2014

(54) REACHING DEVICE

(75) Inventors: Martin Dion, St. Honoré de Témiscouata (CA); Rod Muir, South Mountain (CA); Mike Sirois, Ottawa (CA); Phil Streets, Ottawa (CA); Julian Potvin-Bernal, Chelsea (CA); Andrew Lowe, Ottawa (CA); Peter Wells, Ottawa (CA); Cathy Janveau, Ottawa (CA); Todd MacGillivray, Ottawa (CA); Arland Horner, Shawville (CA); Yves Bedard, Gatineau (CA); Christopher Eady, Ottawa (CA)

(73) Assignee: Canada Post Corporation, Ottawa (CA)

( * ) Notice: Subject to any disclaimer, the term of this patent is extended or adjusted under 35 U.S.C. 154(b) by 0 days.

(21) Appl. No.: 13/490,583

(22) Filed: Jun. 7, 2012

(65) Prior Publication Data

US 2013/0069382 A1    Mar. 21, 2013

(30) Foreign Application Priority Data

Sep. 20, 2011 (CA) .................................... 2753232

(51) Int. Cl.
*A47F 13/06* (2006.01)
(52) U.S. Cl.
USPC .............................. 294/209; 294/24; 294/104
(58) Field of Classification Search
USPC .................... 294/209, 210, 22, 23, 24, 104
See application file for complete search history.

(56) References Cited

U.S. PATENT DOCUMENTS

| | | | |
|---|---|---|---|
| 663,628 A | 12/1900 | Hiett | |
| 858,492 A * | 7/1907 | Ward | 294/22 |
| 858,907 A * | 7/1907 | Potterf | 294/22 |
| 2,181,520 A * | 11/1939 | Pedersen | 294/22 |
| 2,191,858 A | 2/1940 | Moore | |
| 2,462,536 A | 2/1949 | Muter | |
| 2,469,865 A | 5/1949 | Crow | |
| 2,473,146 A | 6/1949 | Hunt | |
| 2,819,110 A | 1/1958 | Redmon | |
| 3,276,806 A | 10/1966 | Hansen | |
| 3,672,279 A | 6/1972 | Hackenberg et al. | |
| 3,937,512 A | 2/1976 | Baughman | |
| 3,990,735 A | 11/1976 | Starz | |
| 4,023,843 A | 5/1977 | Coons | |
| 4,037,868 A | 7/1977 | Baker | |
| 4,160,563 A | 7/1979 | Whitney | |
| 4,622,868 A | 11/1986 | Flannigan | |
| 4,726,263 A | 2/1988 | Lake | |
| 4,962,957 A | 10/1990 | Traber | |
| 5,857,723 A | 1/1999 | Mathieu et al. | |
| 6,189,190 B1 | 2/2001 | Gillet et al. | |

(Continued)

*Primary Examiner* — Saul Rodriguez
*Assistant Examiner* — Gabriela Puig
(74) *Attorney, Agent, or Firm* — Michael Best & Friedrich LLP

(57) ABSTRACT

A reaching device that in one embodiment comprises an elongated member, a jaw, and an actuator for opening and closing the jaw. The jaw includes a pair of holding members, one of which has a tapered lateral side edge. In one embodiment, the reaching device may allow a rural mail carrier to remain seated in the driver's side of a conventional (North American) vehicle, reach through the passenger's window, and perform the following tasks: open a mail box, retrieve mail from the mail box, place mail into the mail box, close the mail box, and raise or lower the indicator flag on the side of the mail box.

17 Claims, 25 Drawing Sheets

(56) References Cited

U.S. PATENT DOCUMENTS

| | | |
|---|---|---|
| 6,460,910 B2 | 10/2002 | Prass |
| 6,669,254 B2 | 12/2003 | Thom et al. |
| 6,820,906 B1 * | 11/2004 | McClendon ................ 294/210 |
| 7,080,863 B2 | 7/2006 | Cappellano et al. |
| 7,226,098 B1 | 6/2007 | Moreira |
| 7,380,336 B2 | 6/2008 | Bennett et al. |
| 8,087,707 B1 * | 1/2012 | Hawkins et al. ............... 294/24 |
| 2005/0040661 A1 | 2/2005 | Hsu |
| 2006/0162502 A1 | 7/2006 | Huang |
| 2013/0068914 A1 * | 3/2013 | MacGillivray et al. ....... 248/523 |

\* cited by examiner

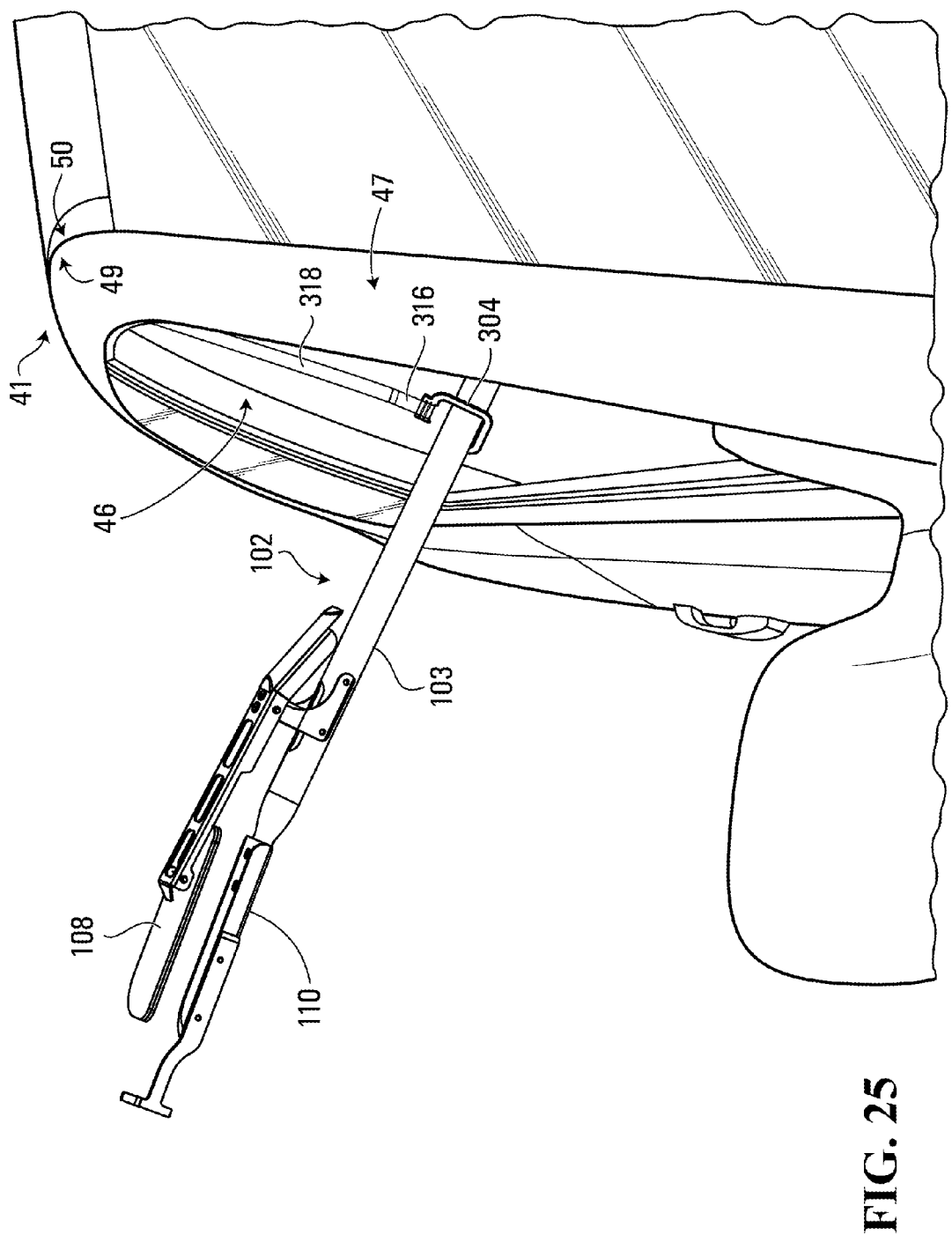

REACHING DEVICE

CROSS-REFERENCE TO RELATED APPLICATIONS

The following application claims the benefit of Canadian Patent Application No. 2,753,232, which was filed on Sep. 20, 2011, and is hereby incorporated by reference in its entirety.

FIELD

This application relates to a reaching device in general, and in particular to a reaching device suitable for use by a rural mail carrier.

BACKGROUND

Rural properties typically have a mail box at the end of a laneway at the side of the road. The rural mail carrier drives up to the mail box and services the mail box by delivering mail and/or picking up any outgoing mail that the owner has placed in the mail box. However, the mail box is usually located on the passenger's side (curb side) of the vehicle, which means that it is sometimes difficult for the mail carrier to reach the mail box while seated in the driver's seat. Thus, in order to deliver mail and pick up outgoing mail, the mail carrier typically has the following options:

(1) The mail carrier can reposition themselves to the passenger's seat to deliver the mail to the mail box.

(2) The mail carrier can work with an assistant that sits on the passenger's side of the vehicle. When the mail carrier pulls over in front of the mail box, the assistant can reach through the passenger's window to service the mail box.

(3) The mail carrier can drive a specially-designed vehicle that has the driver's seat on the curb side. This eliminates the assistant in (2) above, since the mail carrier can reach through his/her own window on the curb side to service the mail box.

Option (1) above can be inefficient and/or difficult to achieve. Options (2) and (3) have added cost, as they require either an additional person (as in option (2) above) or a specially designed car (as in option (3) above).

SUMMARY

Embodiments of reaching devices are disclosed herein. Although these reaching devices are not limited to any one particular application, they are envisioned for use in servicing a mail box from a vehicle. For example, in one embodiment, a reaching device is provided that allows a rural mail carrier to remain seated in the driver's side of a conventional (North American) vehicle, reach through the passenger's window, and perform the following tasks: open a mail box, retrieve mail from the mail box, place mail into the mail box, close the mail box, and raise or lower the indicator flag on the side of the mail box.

According to one aspect of the invention, there is provided a reaching device comprising an elongated member extending between a first end and a second end. A jaw is located at the first end, a first actuator is spaced from the jaw, and a second actuator is located at the second end. Each one of the first actuator and the second actuator is for opening and closing the jaw.

According to another aspect of the invention, there is provided a reaching device comprising an elongated member extending between a first end and a second end. A jaw is located at the first end, and an actuator for opening and closing the jaw is located at the second end. The jaw includes a pair of holding members. One of the holding members has a tapered lateral side edge.

BRIEF DESCRIPTION

Embodiments will now be described, by way of example only, with reference to the accompanying figures wherein:

FIG. 25 illustrates use of the support of FIG. 23.

Like reference numerals are used in different figures to denote similar elements.

DETAILED DESCRIPTION

The embodiments set forth herein represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Figure 1:
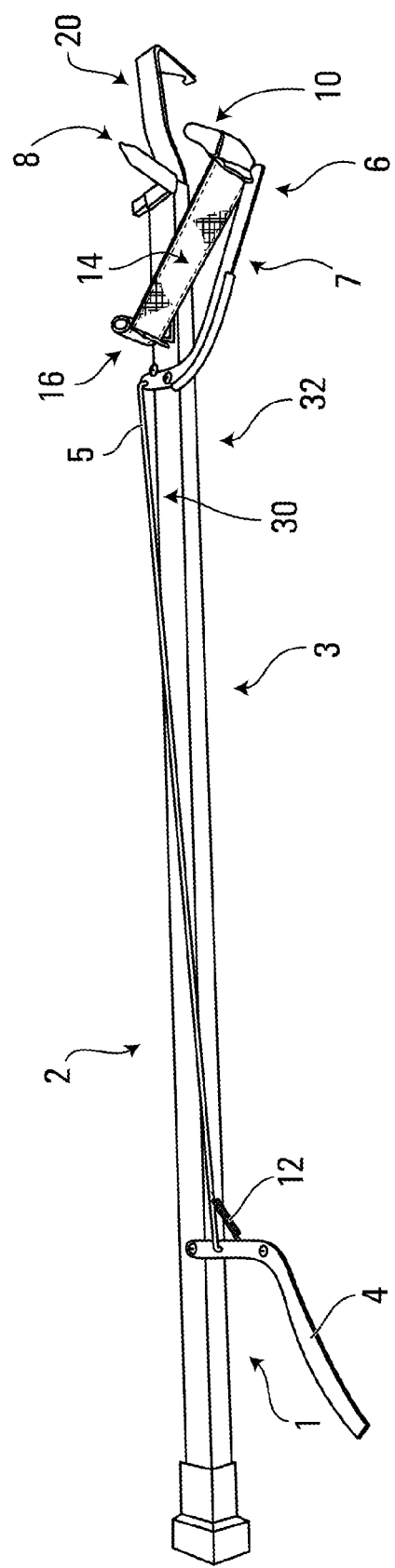
FIG. 1 is a perspective view of an embodiment of a reaching device.

Referring first to FIG. 1, a perspective view of one embodiment of a reaching device 2 is shown. The device 2 includes an elongated member, which in the illustrated embodiment comprises an elongated shaft 3 made out of a light weight material, for example, a composite material such as carbon fibre. A jaw 6 is located at a first end of the shaft 3, and an actuator 1 for opening and closing the jaw 6 is located at an opposite second end of the shaft 3. In the illustrated embodiment, the actuator is a handle 4. The shaft 3 extends between the actuator 1 and the jaw 6.

Figure 2:
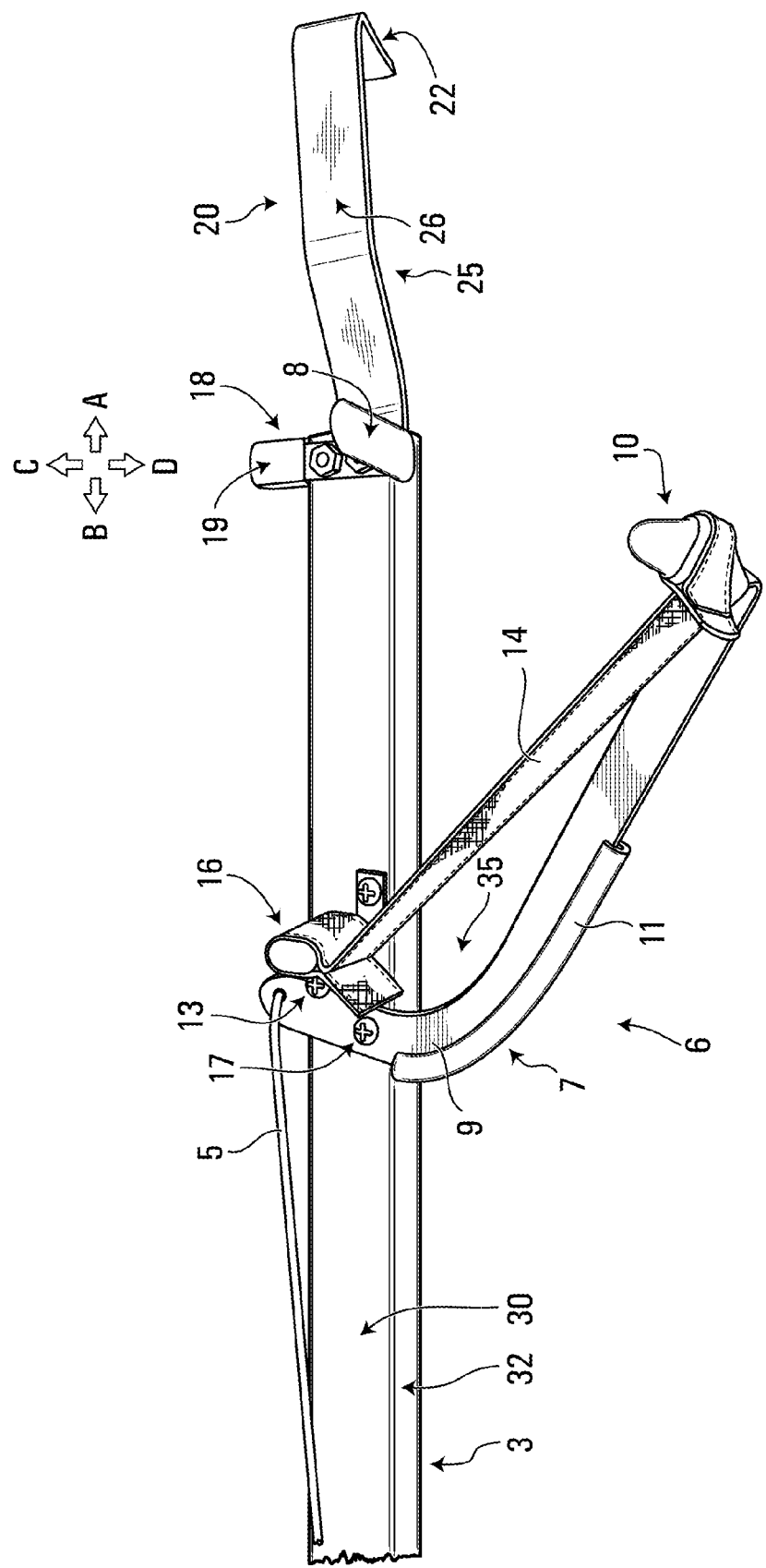
FIG. 2 is a side perspective view of the jaw of the reaching device of FIG. 1, when the jaw is open.

For ease of description, the following orientation will be used in the remaining description when describing the device 2. With reference to FIG. 1, the "front" of the device 2 is the end of the device 2 at which the jaw 6 is located, and the "back" of the device 2 is the end of the device 2 at which the handle 4 is located. With reference to FIG. 2, the arrow A illustrated in this figure points "forward", the arrow B points "backwards", the arrow C points "upwards", and the arrow D points "downwards". Therefore, for example, when "upper" and "lower" portions are described, the upper portion is upwards in relation to the lower portion. The directions "left" and "right" are defined from the perspective of the back of the device 2 looking forward, when the device 2 is oriented as shown in FIGS. 1 and 2. The directions "clockwise" and "counter clockwise" are also defined from this perspective.

Returning now to the details of the device 2, as is best shown in FIG. 2, the jaw 6 of the device 2 includes an arm 7, which is pivotally connected to the shaft 3. The jaw 6 further includes a pair of holding members, which in this embodiment are lips 8, 10. Specifically, an upper lip 8 is connected to the shaft 3, and a lower lip 10 is connected to the arm 7. The upper lip 8 extends to the right, substantially perpendicular to the longitudinal axis of the shaft 3, as does the lower lip 10. Thus, in the illustrated embodiment, the jaw 6 comprises the arm 7, the upper and lower lips 8 and 10, and the portion of the elongated shaft 3 extending between the upper lip 8 and the point at which the arm 7 pivotally connects to the shaft 3.

The arm 7 pivots at pivot point 17, which in the illustrated embodiment is a screw. A stop 13 projects outward from shaft 3 and limits the amount by which the jaw 6 can open by limiting the amount by which the arm 7 can pivot. Specifically, the upper part of the arm 7, above the pivot point 17, pivots towards the stop 13 as the jaw 6 opens, and abuts against the stop 13 when the jaw 6 is in the fully open position. In the illustrated embodiment, the stop 13 is a screw.

The arm 7 includes an elbow 9, which forms a recess 37. The recess 37 allows mail to more easily fit within the jaw 6 when the jaw 6 is closed. The outside edge of the elbow 9 is protected by a bumper 11, which helps protect the mail box and the edge of the passenger's window when the device 2 is being used to service a mail box.

As mentioned earlier with reference to FIG. 1, an actuator 1 is located at the opposite end of the shaft 3. In the illustrated embodiment, the actuator 1 comprises a handle 4. A bar 5 extends between the handle 4 and the arm 7. The bar 5 is movable by the handle 4 to pivot the arm 7 and thereby open and close the jaw 6. A spring 12 is connected between the handle 4 and the shaft 3 and biases the handle 4 to a position in which the handle 4 fully opens the jaw 6. When the handle 4 is squeezed, the lower lip 10 moves towards the upper lip 8 to close the jaw 6. An item such as mail is held between the pair of lips 8, 10.

A flexible member 14 is connected to the jaw 6. In the illustrated embodiment, the flexible member 14 is an elastic strip interposed between the shaft 3 and the arm 7. Specifically, the flexible member 14 is interconnected between the shaft 3 and the arm 7 such that one end of the flexible member 14 is connected to the lower lip 10, and the other end of the flexible member is connected to a fixed arm 16 extending outward from the shaft 3. The fixed arm 16 is adjacent to where the arm 7 of the jaw 6 pivotally connects to the shaft 3, and the fixed arm 16 extends to the right, substantially perpendicular to the longitudinal axis of the shaft 3.

FIG. 2 illustrates the jaw 6 in the fully open position. In this position, the flexible member 14 is taut.

Figure 3:
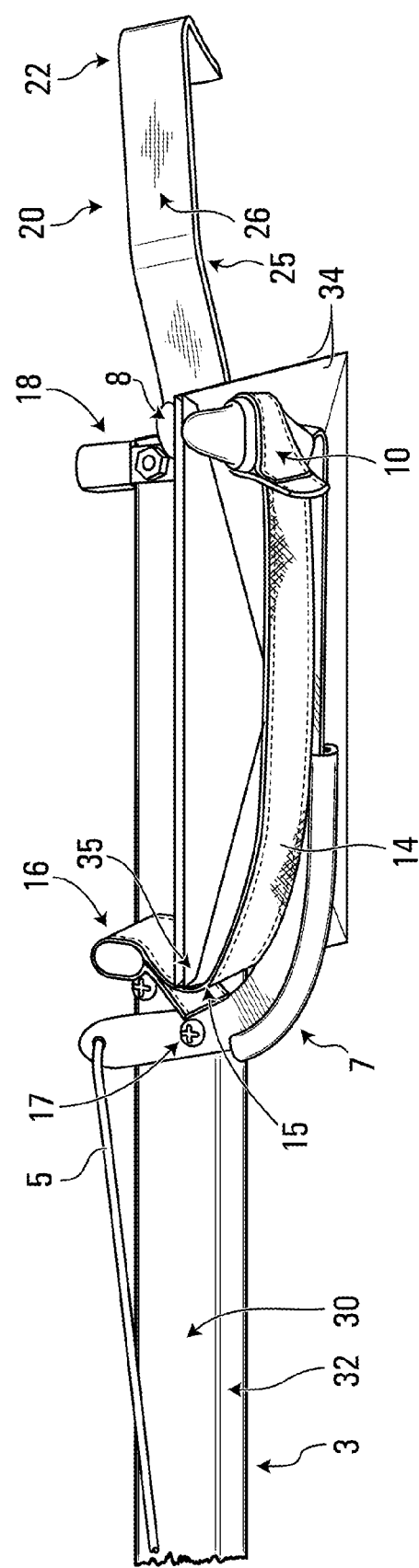
FIG. 3 is a side perspective view of the jaw of the reaching device of FIG. 1, when the jaw is closed.

FIG. 3 illustrates the jaw 6 in the closed position, with items held between lips 8 and 10. The items illustrated are envelopes 34. When the jaw 6 is in the closed position, the flexible member 14 is relaxed and curves to form a cup 15. The ends 35 of the envelopes 34 are placed within the hollow or cup 15 formed by the curve. In the illustrated embodiment, the ends 35 of the envelopes 34 are placed abut against the flexible member 14 in the cup 15, such that the relaxed flexible member 14 partially envelops the ends 35 of the envelopes 34. As will be described in more detail later, the opening of the jaw (i.e. the separation of lips 8 and 10) causes movement of the flexible member 14 to assist in the ejection of the envelopes 34 from the jaw 6 upon release. Specifically, as the jaw 6 opens, the flexible member 14 moves from its relaxed cupped position (shown in FIG. 3) to its taut position (shown in FIG. 2), and in doing so pushes the end 35 of the envelopes 34 forward, which helps to eject the envelopes 34 from the jaw 6 and into a mail box.

Returning to FIG. 2, the reaching device 2 also includes two projecting members for assisting in opening a mail box. The first projecting member is a projecting portion 18 that projects upwards and substantially perpendicular to the longitudinal axis of the shaft 3. In the illustrated embodiment, the projecting portion 18 and the upper lip 8 are integrally formed. The projecting portion 18 includes a frictional cover 19 for assisting in making a frictional contact between the projecting portion 18 and a flange or surface of a mail box (not shown). The second projecting member is a hooking member projecting outward from the device 2. Specifically, in this embodiment, the hooking member comprises a hook 20 that projects forward in a longitudinal direction of the shaft 3 beyond the lips 8, 10. The hook 20 comprises a body 25 and an end portion 22. The body 25 comprises a middle portion 26, which extends in the longitudinal direction of the shaft 3 and then bends to become the end portion 22. Specifically, the hook 20 bends such that the end portion 22 of the hook 20 extends from the body 25 of the hook 20 at a non-zero angle from the body 25. By having the end portion 22 extend from the body 25 at a non-zero angle, a hooking portion is created that can be used to latch onto a mail box. In the illustrated embodiment, the end portion 22 extends substantially 90 degrees to the body 25, and therefore the end portion 22 also extends substantially 90 degrees to the longitudinal axis of the shaft 3. However, the end portion 22 can extend from the body 25 at other non-zero angles, so long as the end portion 22 protrudes from the body 25 at an angle sufficient to create a hooking portion.

Figure 4:
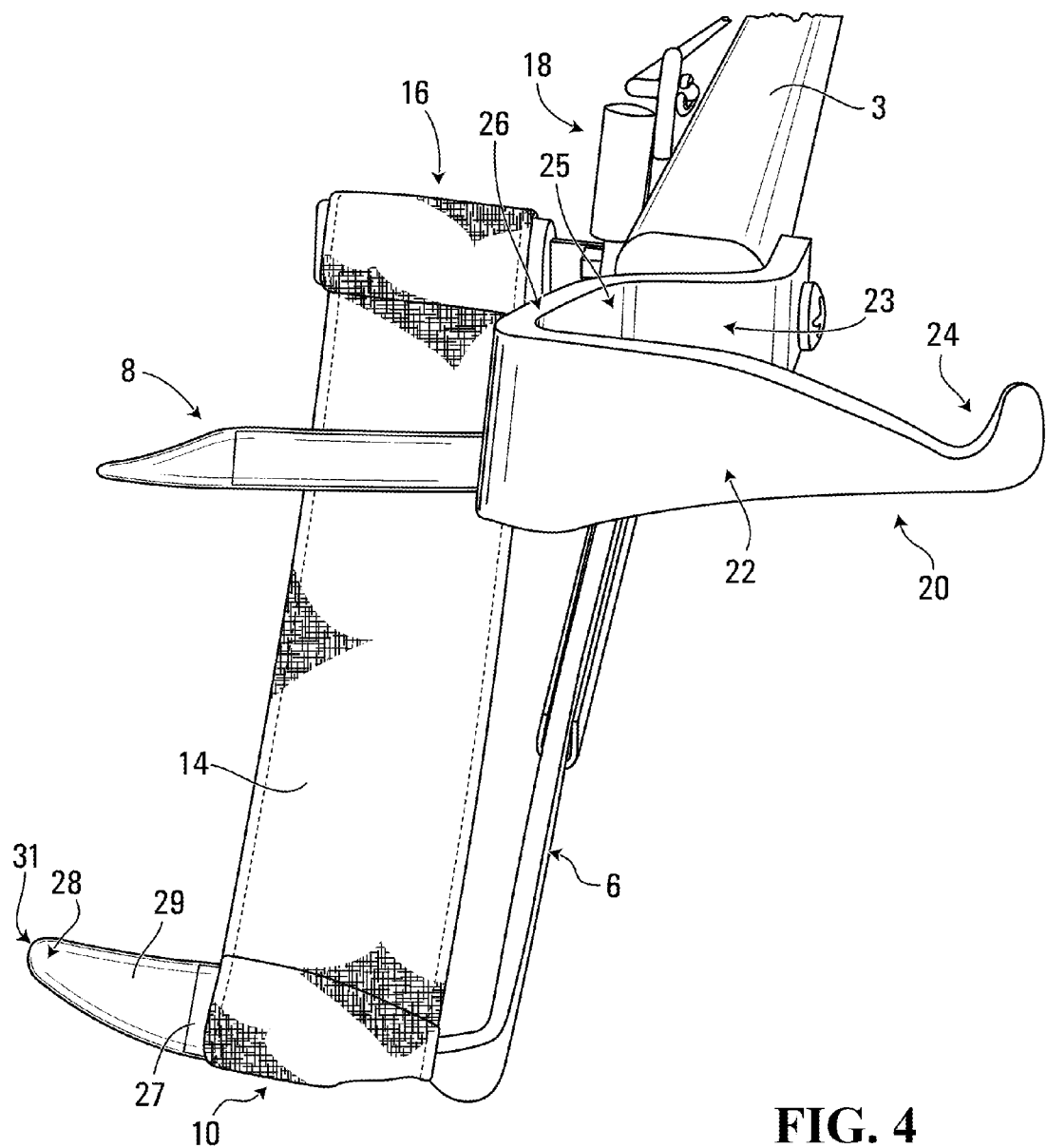
FIG. 4 is a front perspective view of the jaw of the reaching device of FIG. 1, when the jaw is open.

The hook 20 of the illustrated embodiment is shown in greater detail in FIG. 4, which is a front perspective view of the device 2. The hook 20 further includes a notch 24. Specifically, the notch 24 is located at the upper front side of the end portion 22 of the hook 20.

The hook 20 bends such that its end portion 22 extends to the left, in a direction opposite to the upper lip 8. The bend in the hook 20 creates a clearance 23 between the notch 24 and the longitudinal axis of the elongated shaft 3. In the illustrated embodiment, the body 25 of the hook 20 is connected to the shaft 3 on the side of the shaft 3 opposite the side on which the upper lip 8 extends. The clearance 23 is extended by having the body 25 of the hook 20 initially bend towards the upper lip 8 before bending back and parallel to the longitudinal axis of the shaft 3 at the middle portion 26. The extended clearance 23 can facilitate easier hooking of the notch 24 onto an indicator flag on the side of a mail box, since the clearance 23 prevents the middle portion 26 of the hook 20 from interfering with the base of the indictor flag. This is explained in more detail later with respect to FIG. 7. The initial bend of the hook 20 towards the upper lip 8 also results in a longer end portion 22. This extended clearance 23 and longer end portion 22 can facilitate easier hooking onto a handle of a mail box.

Although the initial bend of the hook 20 towards the upper lip 8 could be eliminated by connecting the body 25 of the hook 20 on the opposite side of the shaft 3, by connecting the body 25 of the hook 20 on the side of the shaft 3 opposite the side on which the upper lip 8 extends, the fastening of the hook 20 to the shaft 3 does not interfere with the upper lip 8.

As is best shown in FIG. 4, the lower lip 10 includes an end portion 28 that is flexible and tapers at its lateral side edge 31. Specifically, in the illustrated embodiment, the lower lip 10 comprises a rigid arm 27 with a flexible covering 29 thereon (such as a rubber covering). The covering 29 is snugly fitted onto the rigid arm 27, but extends out past the rigid arm 27. The portion of the flexible covering 29 extending out past the rigid arm 27 forms the flexible end portion 28. The flexible end portion 28 tapers upwards to create the tapered lateral side edge 31.

The tapered lateral side edge 31 allows the lower lip 10 to easily slide underneath mail inside of a mail box, when the mail is being placed into the jaw 6 of the device 2 in the manner described later with reference to FIG. 6.

In the illustrated embodiment, the upper lip 8 also has a matching rigid arm with a matching flexible covering and tapered lateral side edge. The flexible coverings of the upper and lower lips 8 and 10 each form a holding surface. The holding surfaces comprise frictional surfaces that allow the lips to better grip the item held therebetween.

Use of the device 2 will now be explained.

Figure 5:
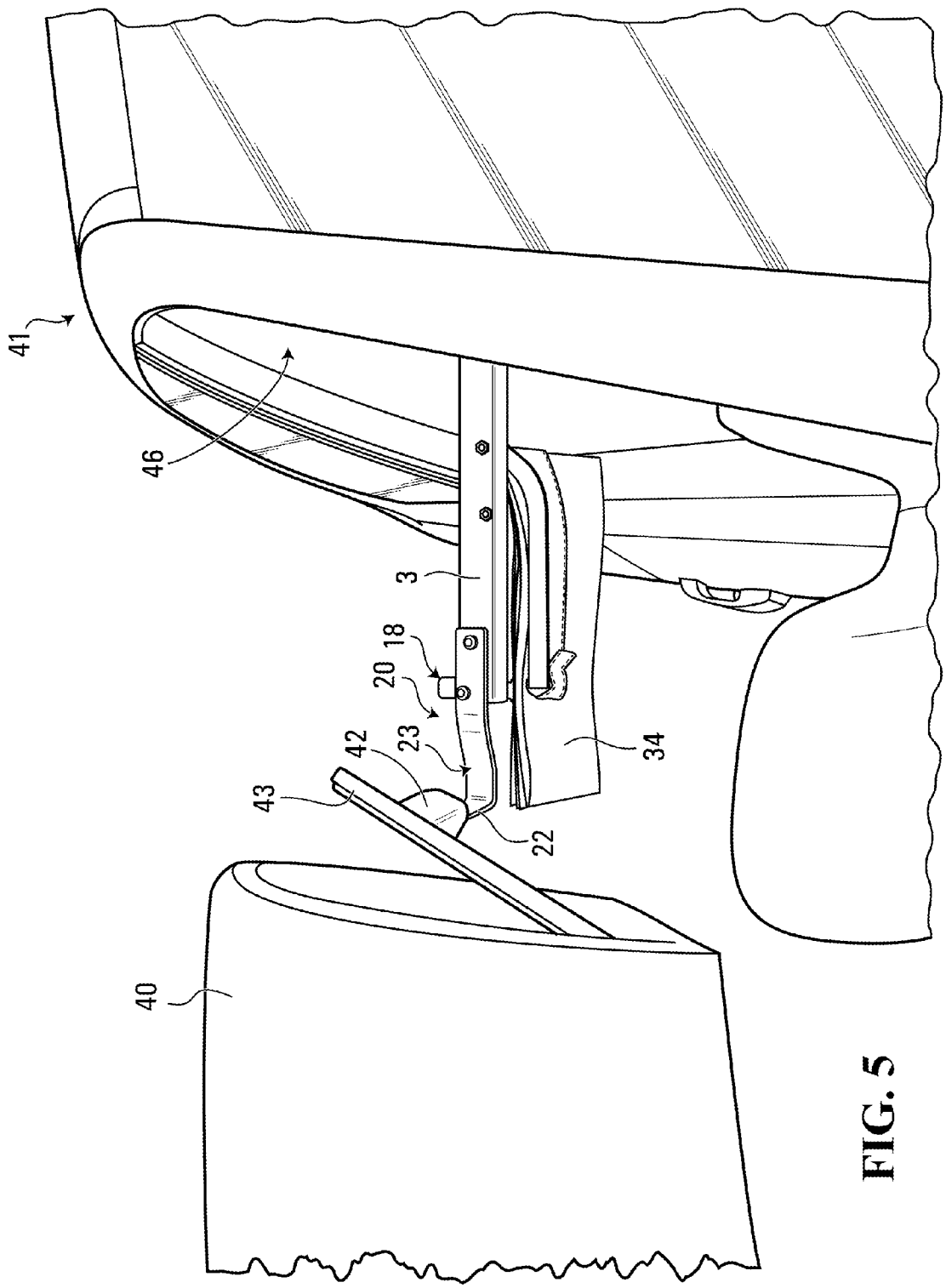
FIG. 5 illustrates use of the reaching device of FIG. 1 for opening a mail box.

With reference to FIG. 5, illustrated is a vehicle 41 of a mail carrier stopped in front of a mail box 40. The vehicle 41 includes a passenger's window 46. The mail box 40 includes a cover 43 with a handle 42 for opening the cover 43. To open the mail box 40 from the driver's seat, the mail carrier extends the device 2 across the passenger's seat (not shown) and through the passenger's window 46. The mail carrier then rotates the device 2 clockwise by approximately 90 degrees, so that the end portion 22 of the hook 20 is projecting upwards. The mail carrier then uses the end portion 22 of the hook 20 as a hooking portion to engage the handle 42 of the mail box 40, as shown in FIG. 5. The extended clearance 23 of the hook 20, explained earlier with reference to FIG. 4, facilitates easier hooking onto the handle 42 due to the extended end portion 22.

In the example mail box 40 illustrated in FIG. 5, the cover 43 is connected via hinges at the base of the mail box 40. Thus, once the mail carrier has hooked onto the handle 42 of the mail box 40, the mail carrier can simply pull the device 2 towards himself or herself to pull open the cover 43 of the mail box 40. Alternatively, other mail boxes (not shown) have their cover hinged at the top instead of the base. For such a mail box, the mail carrier can use the hook 20 or the projecting portion 18 to push up against a flange or other surface on the cover of the mail box.

Figure 6:
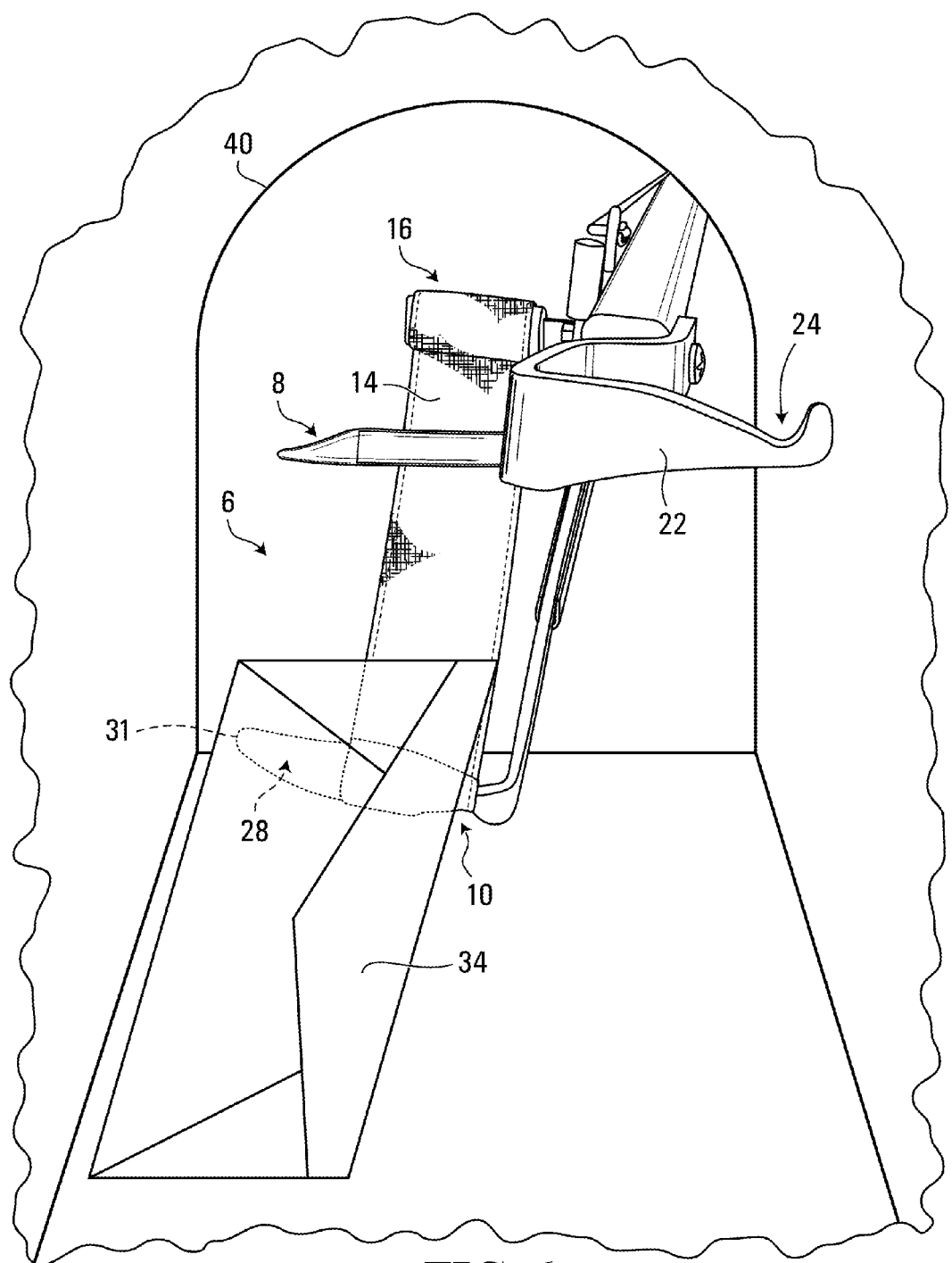
FIG. 6 is a front perspective view of the reaching device of FIG. 1, illustrating the bottom lip of the jaw sliding under mail in a mail box.

Turning now to FIG. 6, once the cover 43 is open, assuming there is mail in the mail box 40 to be retrieved, the mail carrier will insert the jaw 6 into the mail box 40 and slide the bottom lip 10 of the jaw 6 under the mail. As shown in FIG. 6, the mail carrier achieves this by sliding the bottom lip 10 under the mail from the side. This is more easily achieved using end portion 28. Specifically, the flexible and tapered lateral side edge 31 of the end portion 28 allows the bottom lip 10 to easily slide under envelopes and other mail, when sliding the bottom lip 10 under the mail from the side.

Once the bottom lip 10 is sufficiently underneath the mail, as shown in FIG. 6, the mail carrier squeezes the handle 4 to close the jaw 6. The mail is thus held between the top lip 8 and the bottom lip 10. The mail carrier can then pull the device 2 back into his or her vehicle and release the jaw 6 to release the mail.

To place mail into the mail box 40, the mail carrier places the mail between the lips 8 and 10 of the jaw 6 and squeezes the handle 4 so that the jaw 6 closes and the mail is held between the top lip 8 and bottom lip 10. As the jaw 6 closes, the flexible member 14 relaxes and thereby forms a curve or cup, such as cup 15 illustrated in FIG. 3. This allows the end 35 of the mail to be placed within the hollow or cup 15 formed by the curve. As also illustrated in FIG. 3, the end 35 of the mail can be placed abut against the flexible member 14.

The mail carrier then inserts the jaw 6 of the device 2 into the mail box and releases the handle 4 to release the mail. In releasing the handle 4, the flexible member 14 moves or snaps back into its taut resting position (of FIG. 2) as the jaw 6 opens, and in doing so pushes the mail away from the jaw 6 and thus assists in ejecting the mail from the jaw 6 and onto the base of the inside of the mail box 40.

Once the mail has been safely placed inside of the mail box 40, the projecting portion 18 or the hook 20 can be used to close the cover 43 of the mail box 40, simply by pushing the cover shut.

Figure 7:
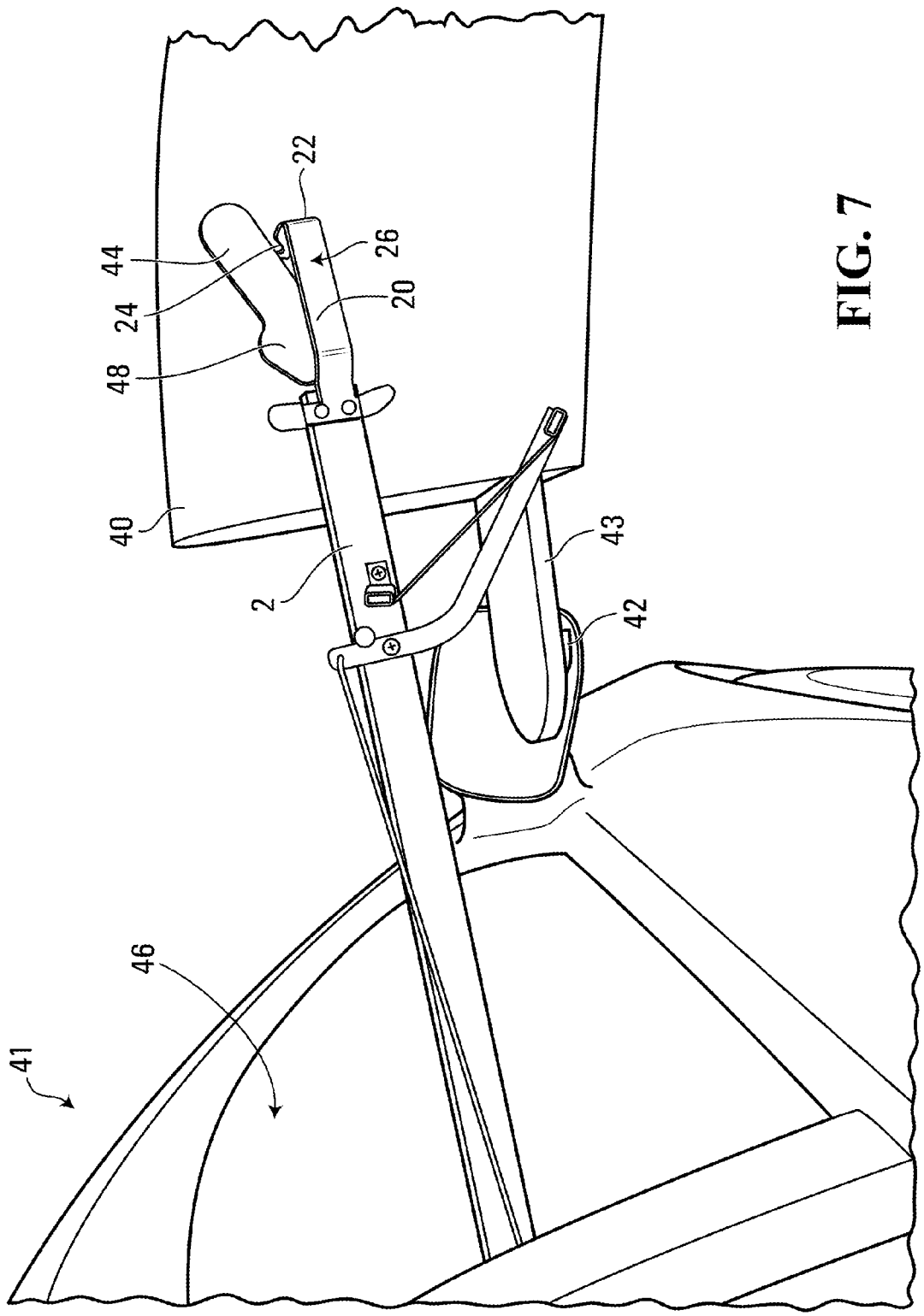
FIG. 7 illustrates use of the reaching device of FIG. 1 for raising an indicator flag on a mail box.

Turning now to FIG. 7, an indicator flag 44 is shown pivotally mounted to the side of the mail box 40 at the base 48 of the indicator flag 44. The indicator flag 44 is used to indicate the presence of mail, and is often referred to as a "red flag", since it has traditionally been the colour red.

As shown in FIG. 7, the notch 24 at the end portion 22 of the hook 20 can be used to engage the staff of the indicator flag 44 to raise the flag 44. The indicator flag 44 is typically on the right hand side of the mail box 40 when viewed from the perspective of the vehicle 41. Therefore, it is beneficial that the hook 20 bends to the left. If the end portion 22 of the hook 20 extended in the other direction instead (i.e. in the same direction as the top lip 8 in the illustrated embodiment), then it would be more awkward for the mail carrier to try and engage the staff of the indicator flag 44.

The extended clearance 23 of the hook 20, explained earlier with reference to FIG. 4, provides extra clearance to facilitate easier hooking of the notch 24 onto the indicator flag 44. Specifically, the extended clearance 23 prevents the middle portion 26 of the hook 20 from interfering with the base 48 of the indicator flag 44.

To lower the indicator flag 44, the mail carrier can push the indicator flag 44 down using the blunt end of the end portion 22 of the hook 20.

Alternatively, some rural mail boxes do not have an indicator flag, but instead can be rotated in a certain direction to indicate that there is mail in the mail box. The hook 20 may be used to rotate such a mail box.

Another embodiment of a reaching device will now be described with reference to FIGS. 8 to 18.

Figure 8:
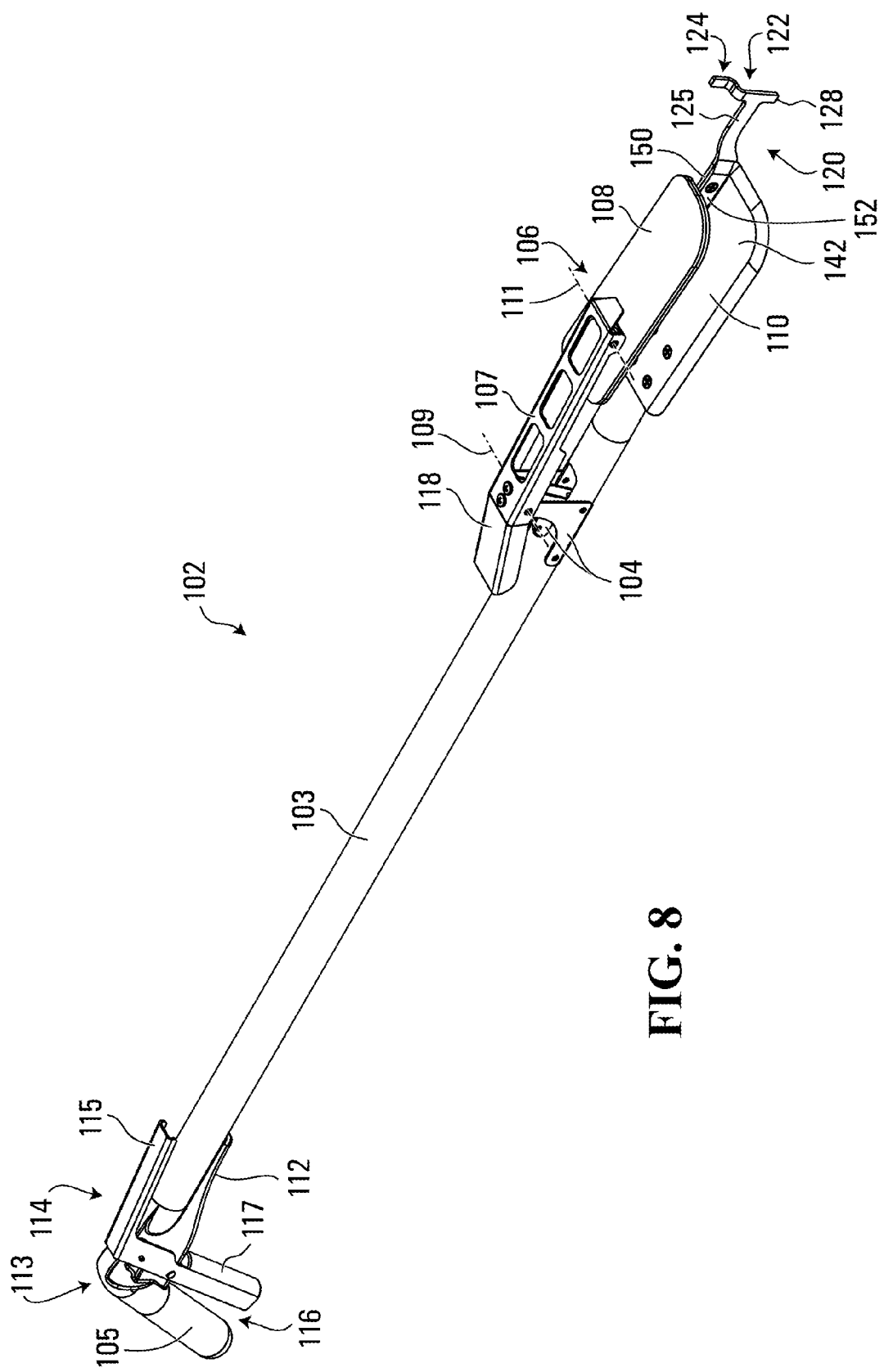
FIG. 8 is a perspective view of another embodiment of a reaching device.

Referring first to FIG. 8, a perspective view of another reaching device 102 is shown. The device 102 includes an elongated member, which in the illustrated embodiment comprises an elongated tube or shaft 103 made out of a light weight material. A jaw 106 is located at a first end of the shaft 103, and a first actuator 114 and a second actuator 116 are located at an opposite second end of the shaft 103. Each one of the first actuator 114 and the second actuator 116 is for opening and closing the jaw 106. In the illustrated embodiment, the first actuator 114 comprises a handle 115, and the second actuator 116 also comprises a handle 117. The shaft 103 extends between the jaw 106 and the actuators 114 and 116.

Figure 9:
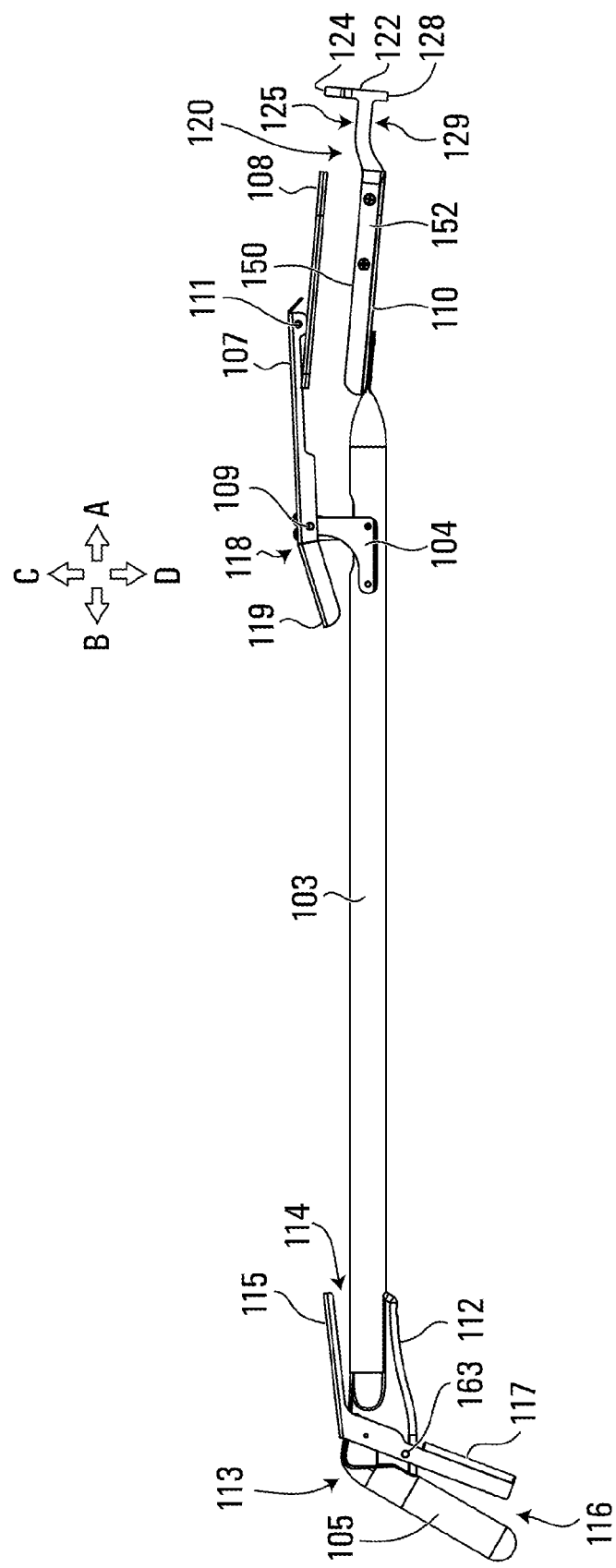
FIG. 9 is a side view of the reaching device of FIG. 8.

For ease of description, the same orientation will be used when describing device 102, as was used when describing device 2. That is, with reference to FIG. 8, the "front" of the device 102 is the end of the device 102 at which the jaw 106 is located, and the "back" of the device 102 is the end of the device 102 at which the handles 115 and 117 are located. With reference to FIG. 9, the arrow A illustrated in this figure points "forward", the arrow B points "backwards", the arrow C points "upwards", and the arrow D points "downwards". Therefore, for example, when "upper" and "lower" portions are described, the upper portion is upwards in relation to the lower portion. The directions "left" and "right" are defined from the perspective of the back of the device 102 looking forward, when the device 102 is oriented as shown in FIGS. 8 and 9. The directions "clockwise" and "counter clockwise" are also defined from this perspective.

Returning now to the details of the device 102, as is best shown in FIGS. 8 and 9, the jaw 106 of the device 102 includes an arm 107, which is pivotally connected to the shaft 103. Specifically, in the illustrated embodiment, a pair of supporting members 104 are mounted on opposite sides the shaft 103 and extend upward from the shaft 103. The arm 107 is pivotally connected to the upper end of each of the supporting members 104. The pivotal connections define an axis 109, around which the arm 107 pivots. The pivoting of the arm 107 opens and closes the jaw 106.

The jaw 106 further includes a pair of holding members 108, 110, which in this embodiment comprise planar holding surfaces. The holding members 108, 110, extend forward in front of the shaft 103. The holding member 110 is fixed to the front end of the elongated member 103, whereas the holding member 108 is pivotally connected to the front end of the arm 107. Specifically, in the illustrated embodiment, the top of the holding member 108 pivotally connects to the front end of the arm 107 at laterally opposite points, which define ends of a fixed axis 111 around which the holding member 108 pivots.

Thus, in this illustrated embodiment, the jaw 106 comprises the arm 107, the holding members 108, 110, the support members 104, and the portion of the elongated shaft 103 extending between the holding member 110 and the point at which the arm 107 connects to the shaft 103 via the support members 104.

Figure 10:
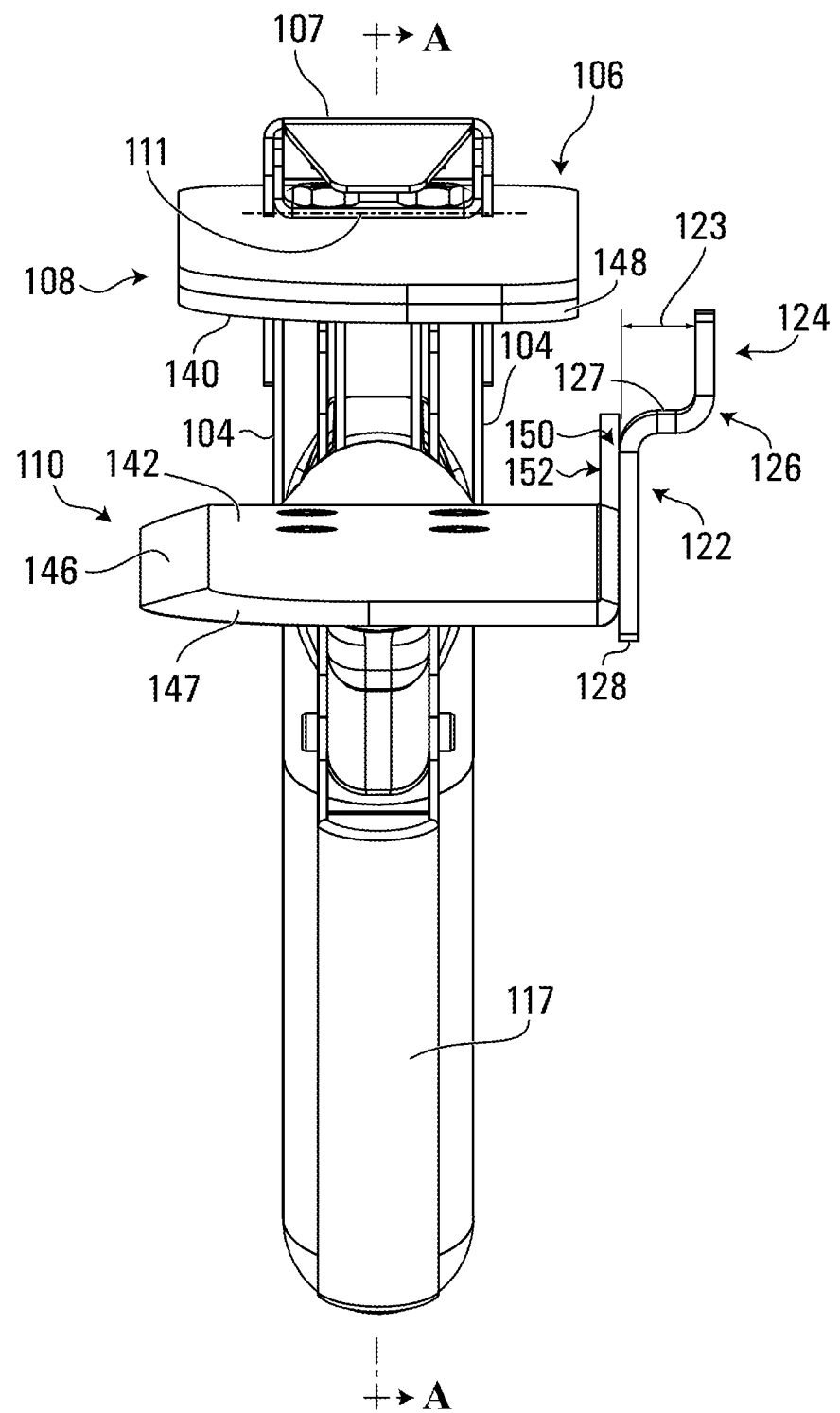
FIG. 10 is a front view of the reaching device of FIG. 8.

The holding members 108 and 110 are illustrated best in FIG. 10. Each one of the holding members 108 and 110 includes a substantially planar holding surface 140 and 142 respectively. The holding surface 142 of the holding member 110 includes a tapered lateral side edge 146, which allows the holding member 110 to easily slide underneath mail inside of a mail box when the mail is being placed into the jaw 106 of the device 102, as described later with reference to FIG. 14. In the illustrated embodiment, the holding surface 142 of the holding member 110 also includes a tapered front edge 147, which can also assist in placing mail into jaw 106.

In the illustrated embodiment, the holding surface 140 of the other holding member 108 includes a frictional coating or covering 148 to assist in gripping items in the jaw 106. A similar coating or covering may be provided on a portion or the entire holding surface 142. However, by not having as much of a frictional coating or covering on the holding surface 142, it makes it easier for the holding member 110 to slide under an item when picking up that item, and it makes it easier for subsequently releasing the item from the jaw 106.

Included within the jaw 106 is a stop 150. Specifically, in the illustrated embodiment, the stop 150 is connected to the holding member 110 at the side of the holding member 110 opposite the tapered lateral side edge 146. The stop 150 provides an abutment surface 152 that projects upwards from the holding surface 142, towards the holding member 108. In the illustrated embodiment, the abutment surface 152 projects perpendicular to the holding surface 142, although substantially perpendicular projection is not a requirement in order to achieve the stopping functionality. As will be explained in more detail later, the stop 150 assists in picking up an item such as mail in a mail box, by stopping the item from sliding past the holding member 110 and out of the jaw 106, when the item is being slid into the jaw 106 using the tapered lateral side edge 146.

In the illustrated embodiment, the holding surface 142 with the tapered edges 146 and 147 is larger than the holding surface 140, such that when the jaw 106 is closed, the holding surface 140 is received between the stop 150 and the tip of the tapered edge 146. An item held in the jaw 106 is held between the holding surfaces 140 and 142.

With reference to FIG. 8, the reaching device 102 also includes a projecting member comprising a hooking member 120 projecting outward from the device 102. Specifically, in this embodiment, the hooking member 120 projects in front of the holding members 108 and 110. The hooking member 120 comprises a body 125 and an end portion 122. The body 125 is connected to the holding member 110 and extends forward in substantially the same direction as the longitudinal axis of the shaft 103.

The end portion 122 of the hooking member 120 extends from the body 125 of the hooking member 120 at a non-zero angle from the body 125. By having the end portion 22 extend from the body 125 at a non-zero angle, a hooking portion is created that can be used to latch onto a mail box. In the illustrated embodiment, the end portion 122 extends upwards, substantially 90 degrees to the body 125, which is also substantially 90 degrees to the longitudinal axis of the shaft 103 and to the holding surfaces 140 and 142. However, the end portion 122 can extend from the body 125 at other non-zero angles, so long as the end portion 122 protrudes from the body 125 at an angle sufficient to create a hooking portion.

As is best shown in FIG. 10, the upper end 124 of the end portion 122 is jogged or offset, as shown at 126. Specifically, in the illustrated embodiment, the upper end 124 bends away from the holding member 108, to create a latching surface 127, and then the upper end 124 bends back upwards, so that it is again substantially perpendicular to the holding surfaces 140 and 142. That is, using the orientation defined herein, the upper end 124 bends to the left and then up. The offset 126 created by the bend provides a clearance 123.

The upper end 124 forms a hooking portion, which can be used for both hooking onto a handle of a mail box and hooking onto a staff of an indicator flag on a mail box. Specifically, as will be explained in more detail later, the latching surface 127 and the clearance 123 can facilitate easier hooking of a staff of an indicator flag, since the latching surface 127 can be used to engage the staff of the indicator flag, and the clearance 123 can prevent the body 125 and the holding members 108 and 110 from interfering with the indicator flag.

In the illustrated embodiment, the end portion 122 also includes a further hooking portion 128 extending downward in the opposite direction of the upper portion 124. The further hooking portion 128 can also be used for hooking onto a handle on a mail box, or may be used for breaking ice. The hooking member 120 is made out of a robust material suitable for such tasks, such as metal.

As is best shown in FIG. 9, the body 125 of the hooking member 120 also bends upwards, away from the holding member 110 and away from the longitudinal axis of the shaft 103, to form a recess 129. The recess 129 allows for easier hooking using hooking portion 128, without the need for the end portion 122 to extend below holding member 110.

A benefit of the hooking member 120 of the present embodiment compared to the hooking member 20 in the earlier embodiment is that the hooking member 120 can achieve many of the same functions as the hooking member 20, but the hooking member 120 is smaller than the hooking member 20 and does not project out as far from the longitudinal axis of the shaft 103 (e.g. clearance 123 is smaller than clearance 23), which can make the device 102 easier to manipulate inside constrained spaces, such as inside of a mail box.

Referring to FIG. 9, at the opposite end of the shaft 103 is a fixed gripping end 113, as well as the first actuator 114 and the second actuator 116. Each one of the first actuator 114 and the second actuator 116 is for opening and closing the jaw 106. The actuators 114 and 116 are offset from each other. As will be explained in more detail later, the provision of the two actuators 114 and 116 offset from each other facilitates ergonometric loading and releasing of items from the jaw 106.

As mentioned earlier, in the illustrated embodiment, the first actuator 114 comprises the handle 115, and the second actuator 116 comprises the handle 117.

The gripping end 113 is secured to the end of the shaft 103 and acts as an extension of the shaft 103, allowing the device 102 to be securely held when squeezing the handle 115 or the handle 117. Specifically, in the illustrated embodiment, the handle 115 extends forward from the gripping end 113 and overlies the shaft 103 at a non-zero angle in relation to the shaft 103. The gripping end 113 includes a gripping surface 112 extending underneath the shaft 103, opposite the handle 115. The gripping surface 112 allows the device 102 to be securely held when squeezing the handle 115 towards the shaft 103. The gripping end 113 also includes a fixed handle 105 extending down from the back end of the shaft 103, at an angle slightly greater than 90 degrees from the shaft 103. The handle 117 also extends down from the back end of the shaft 103, at a non-zero angle in relation to the shaft 103, opposite from and in front of the fixed handle 105. The fixed handle 105 allows the device 102 to be securely held when squeezing the handle 117 towards the fixed handle 105.

In the illustrated embodiment, the handles 115 and 117 are connected and integrally formed. The handles 115 and 117 are pivotally connected on opposite sides of the gripping end 113. The pivotal connections on the opposite sides of the gripping end 113 define an axis 163 around which the handles 115 and 117 pivot. Both of the handles 115 and 117 pivot on the same axis 163, and since the handles 115 and 117 are integrally formed, when one of handles 115 and 117 pivots, the other of handles 115 and 117 also pivots.

The handle 117 extends at a non-zero angle in relation to the handle 115 and vice versa. For example, the handles 115 and 117 may be substantially perpendicular to each other, or the handles 115 and 117 may be offset by an angle slightly greater than 90 degrees. In the illustrated embodiment, the handles 115 and 117 are offset by an angle slightly greater than 90 degrees and less than 135 degrees. In other embodiments, the handles 115 and 117 can be offset by an angle less than substantially 90 degrees, as long as they can still be manipulated in the manner described later with reference to FIGS. 15 and 17 to open the jaw 106.

Figure 11:
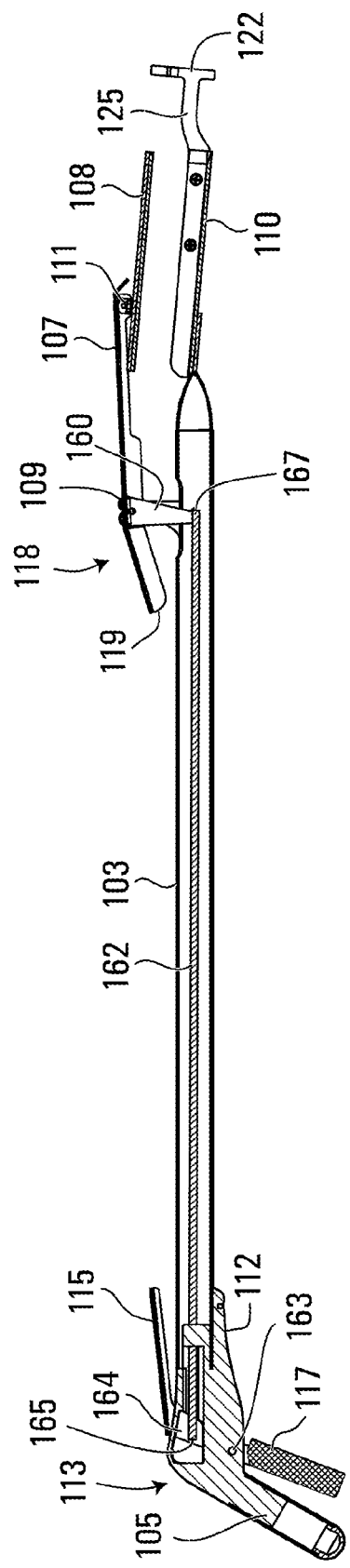
FIG. 11 is a cross-sectional view of the reaching device of FIG. 8 taken along the line A-A of FIG. 10.

FIG. 11 is a cross-sectional view taken along the line A-A of FIG. 10. As shown in FIG. 11, a fixed linkage 164 is pivotally connected to axis 163. The handle 115 is connected to the top end of the fixed linkage 164, above the axis 163, and the handle 117 is connected to the bottom end of the fixed linkage 164, below the axis 163. Additionally, a bar 162 is connected to the linkage 164, above the axis 163, at the connection point 165. The bar 162 extends through the shaft 103 and connects to the bottom of another fixed linkage 160, at the connection point 167. The fixed linkage 160 extends between the connection point 167 and the arm 107 of the jaw 106. Squeezing the handle 115 or the handle 117 causes the fixed linkage 164 to pivot around axis 163 and move the bar 162 forward. The forward movement of the bar 162 causes the bottom of the fixed linkage 160 to move forward, thereby causing the arm 107 to pivot around axis 109 and rise.

The handles 115 and 117 are biased by a spring (not shown) such that in their resting position (when not being squeezed) they cause the arm 107 to be lowered and thus the jaw 106 to be closed.

The device 102 further includes a third actuator 118 spaced from the first and second actuators 114 and 116. In the illustrated embodiment, the third actuator comprises a handle 119 connected to the arm 107. The handle 119 extends in the opposite direction of the arm 107, and is connected to the arm 107 behind the axis 109. Thus, the handle 119 is a lever. Specifically, when the handle 119 is depressed, it pivots down, which causes the arm 107 to rise, like a seesaw. The handle 119 is also biased to a resting position in which the jaw 106 is closed. In some embodiments, the third actuator 118 may not be present.

Figure 12:
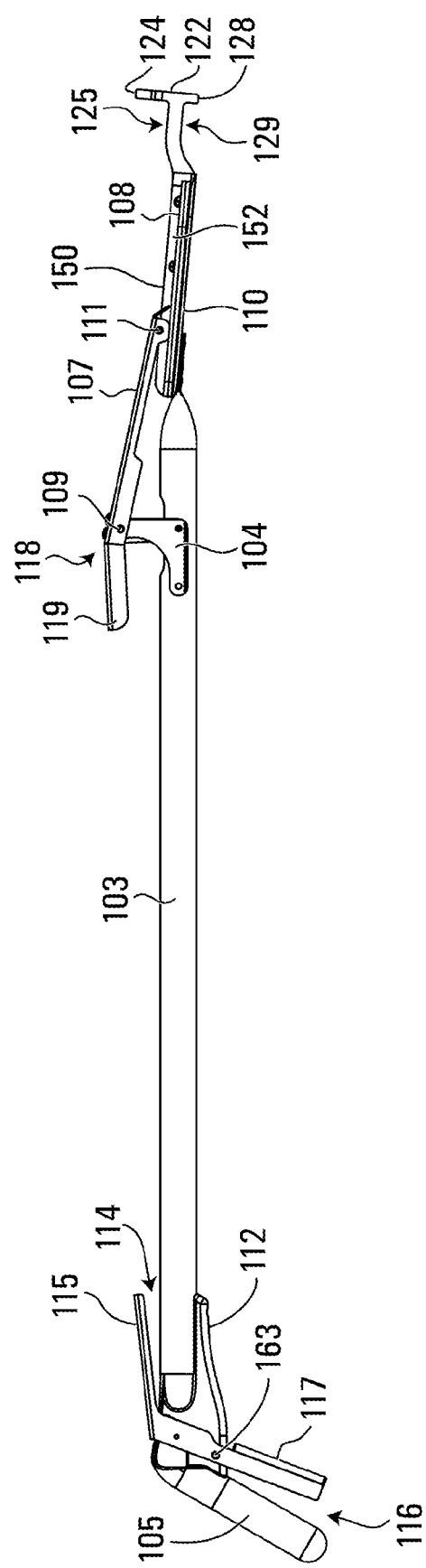
FIG. 12 is a side view of the reaching device of FIG. 8, with the jaw closed.

FIGS. 8 through 11 illustrate the device 102 when the handle 119 is being squeezed, such that the jaw 106 is open. FIG. 12 is the device 102 as shown in FIG. 9, but in the resting position when none of the actuators 114, 116, and 118 are engaged and the jaw 106 is closed with nothing being held therein. As is best illustrated by comparing FIGS. 9 and 12, the pivotal connection of the holding member 108 at axis 111 allows the front of the holding member 108 to pivotally rise when the arm 107 lowers and the holding member 108 meets the holding member 110. This causes the holding members 108 and 110 to be flush with each other when the jaw 106 is closed and nothing is being held between the holding members 108 and 110. Additionally, when an item is being held in the jaw 106, the pivotal connection of the holding member 108 at axis 111 allows the holding member 108 to naturally vertically adjust and better align with the top of the item, thus causing the item to be more securely held in the jaw 106.

Use of the device 102 will now be explained.

With reference to FIG. 13, illustrated again is a vehicle 41 of a mail carrier stopped in front of a mail box 40. The vehicle 41 includes a passenger's window 46. The mail box 40 includes a cover 43 with a handle 42 for opening the cover 43. To open the mail box 40 from the driver's seat, the mail carrier extends the device 102 across the passenger's seat (not shown) and through the passenger's window 46. The upper portion 124 of the hooking member 120 is used to engage the handle 42 of the mail box 40, as shown in FIG. 13.

Figure 13:
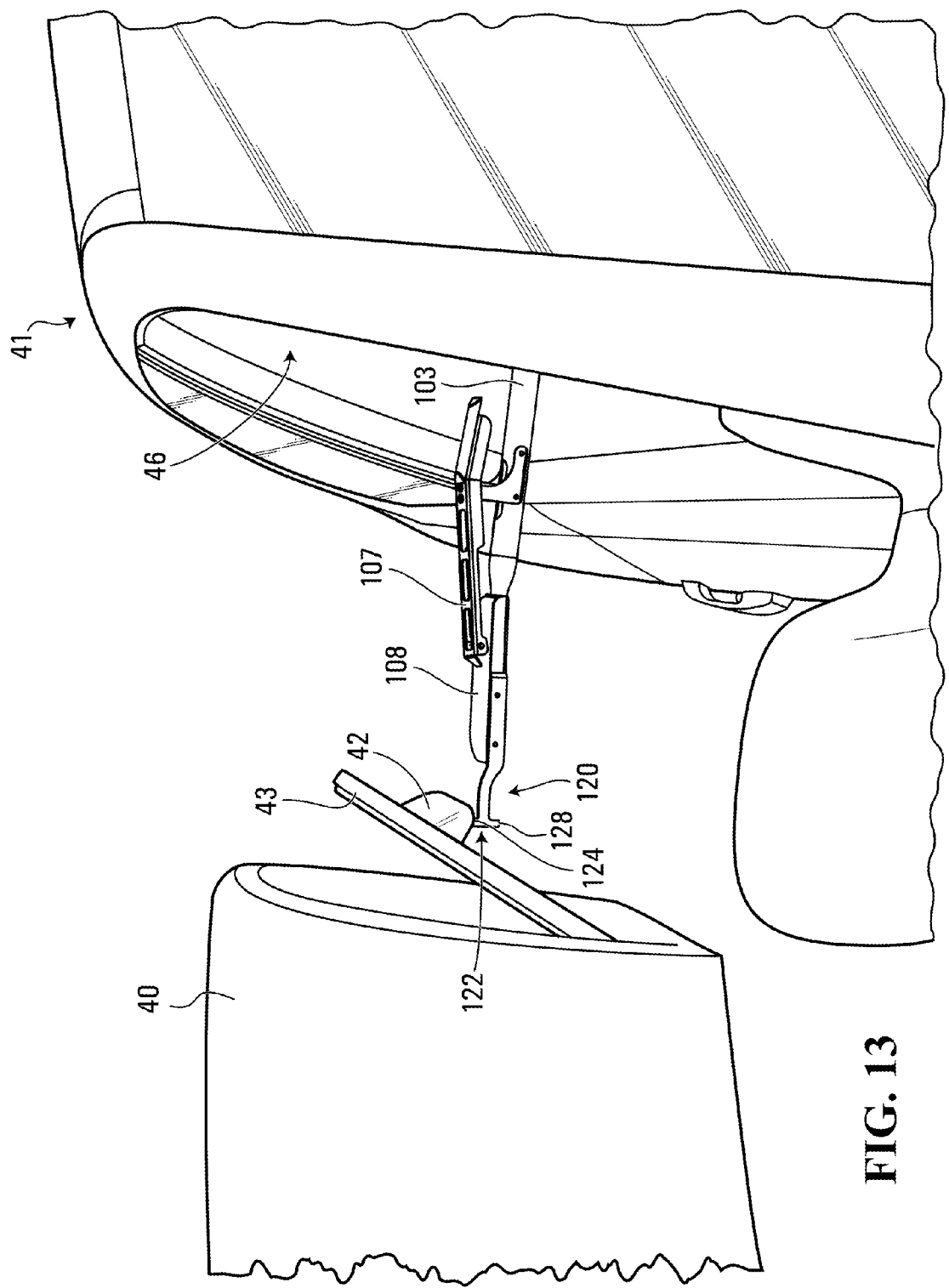
FIG. 13 illustrates use of the reaching device of FIG. 8 for opening a mail box.

In the example mail box 40 illustrated in FIG. 13, the cover 43 is connected via hinges at the base of the mail box 40. Thus, once the mail carrier has hooked onto the handle 42 of the mail box 40, the mail carrier can simply pull the device 102 towards himself or herself to pull open the cover 43 of the mail box 40. Alternatively, other mail boxes (not shown) have their cover hinged at the top instead of the base. For such a mail box, the mail carrier can still use end portion 122 of the hooking member 120 to push up against a flange or other surface on the cover of the mail box.

Figure 14:
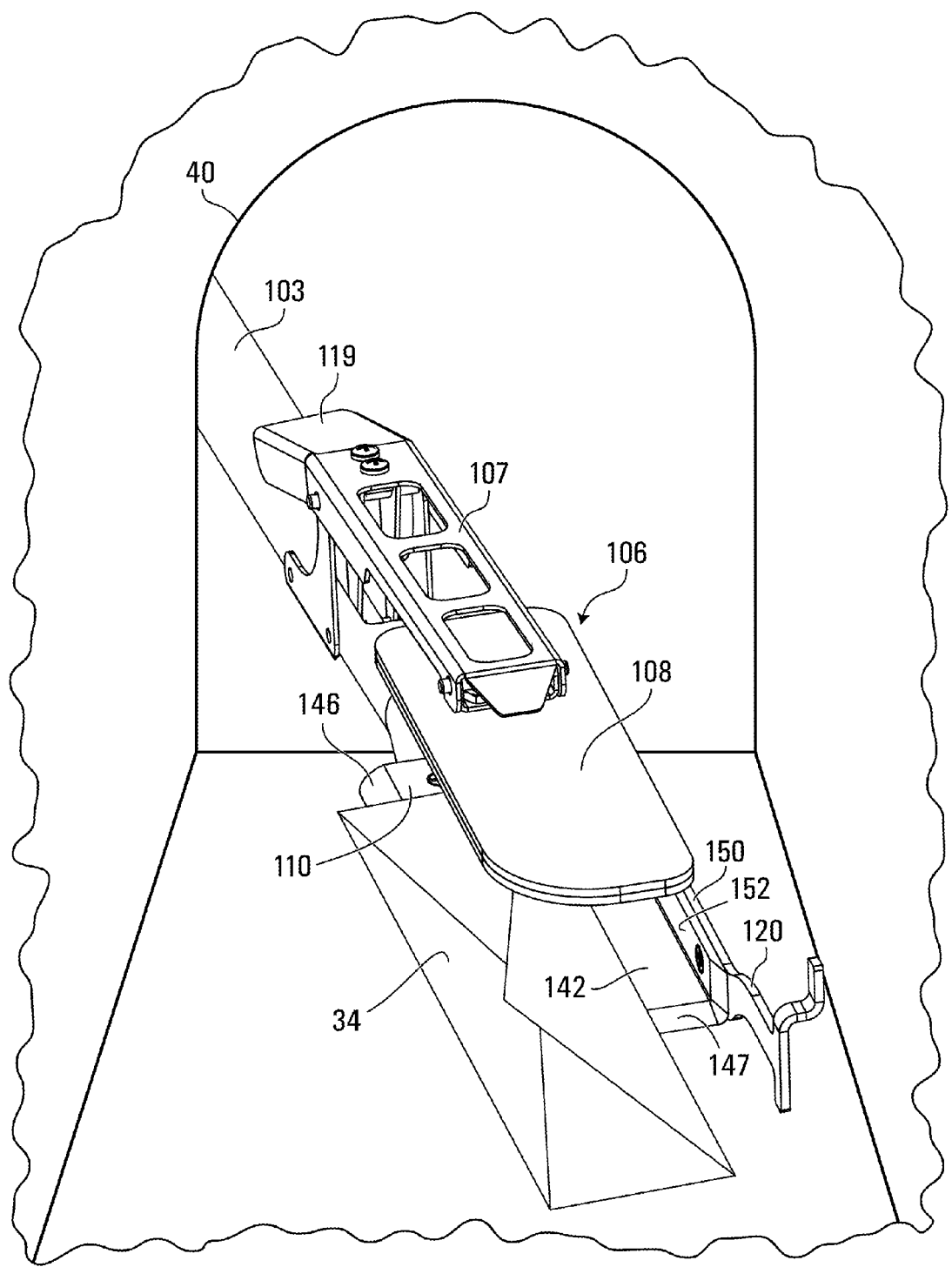
FIG. 14 illustrates use of the reaching device of FIG. 8 for retrieving mail in a mail box.

Turning now to FIG. 14, once the cover of the mail box 40 is open, assuming there is mail in the mail box 40 to be retrieved, the mail carrier will insert the jaw 106 into the mail box 40 and open the jaw 106 by squeezing either the handle 115 or the handle 117. As will be described later with reference to FIG. 15, the handle 115 is typically the best handle to use in this position from an ergonometric point of view. Once the jaw 106 is opened, the mail carrier slides the holding member 110 of the jaw 106 under the mail from the side, as shown in FIG. 14. This is more easily achieved using tapered lateral side edge 146. Specifically, the tapered lateral side edge 146 allows the side of the holding member 110 to easily slide under envelopes and other mail. Tapered front edge 147 can also assist in sliding the holding member 110 under the mail, particularly if part of the front edge of the holding member 110 is slid under the mail.

As the mail is being slid onto holding member 110, the abutment surface 152 of stop 150 stops the mail from sliding past and off the opposite side of the holding member 110.

Once the holding member 110 is sufficiently underneath the mail, the mail carrier releases the handle to close the jaw 106. The mail is thus held between the holding members 108 and 110. The mail carrier can then pull the device 102 back into his or her vehicle 41. For added mail security, when the mail carrier is pulling the device 102 back into his or her vehicle 41, the mail carrier may rotate the device 102 in a counter-clockwise motion by approximately 90 degrees so that the abutment surface 152 of the stop 150 also supports the mail, thereby even further reducing the possibility of mail falling out of the jaw 106.

Once the device 102 has been pulled into the vehicle, the mail carrier can use one of the three actuators 114, 116, or 118 to open the jaw 106 to release the mail.

As mentioned earlier with reference to FIG. 11, the jaw 106 is biased closed when none of the handles are being squeezed (i.e. in the resting position). By having the jaw 106 biased in this manner, the mail carrier is able to more easily manipulate the device 102 when an item such as mail is being held in the jaw 106 of the device 102, since the mail carrier does not have to exert any effort (e.g. squeeze a handle) to keep the item held in the jaw 106.

To deliver mail, the mail carrier remains in the driver's seat, initially with the whole device 102 inside of the vehicle. The device 102 is positioned across the mail carrier's lap, such that the handles 115 and 117 are near the left hand, and the handle 119 is closer to the right hand.

The mail to be delivered is first placed inside of the jaw 106 of the device 102. Either one of the handles 115, 117, or 119 can be used to open the jaw 106. However, when loading mail into the jaw 106, the use of the handle 115 or the handle 119 will typically be the most ergonometric.

Figure 15:
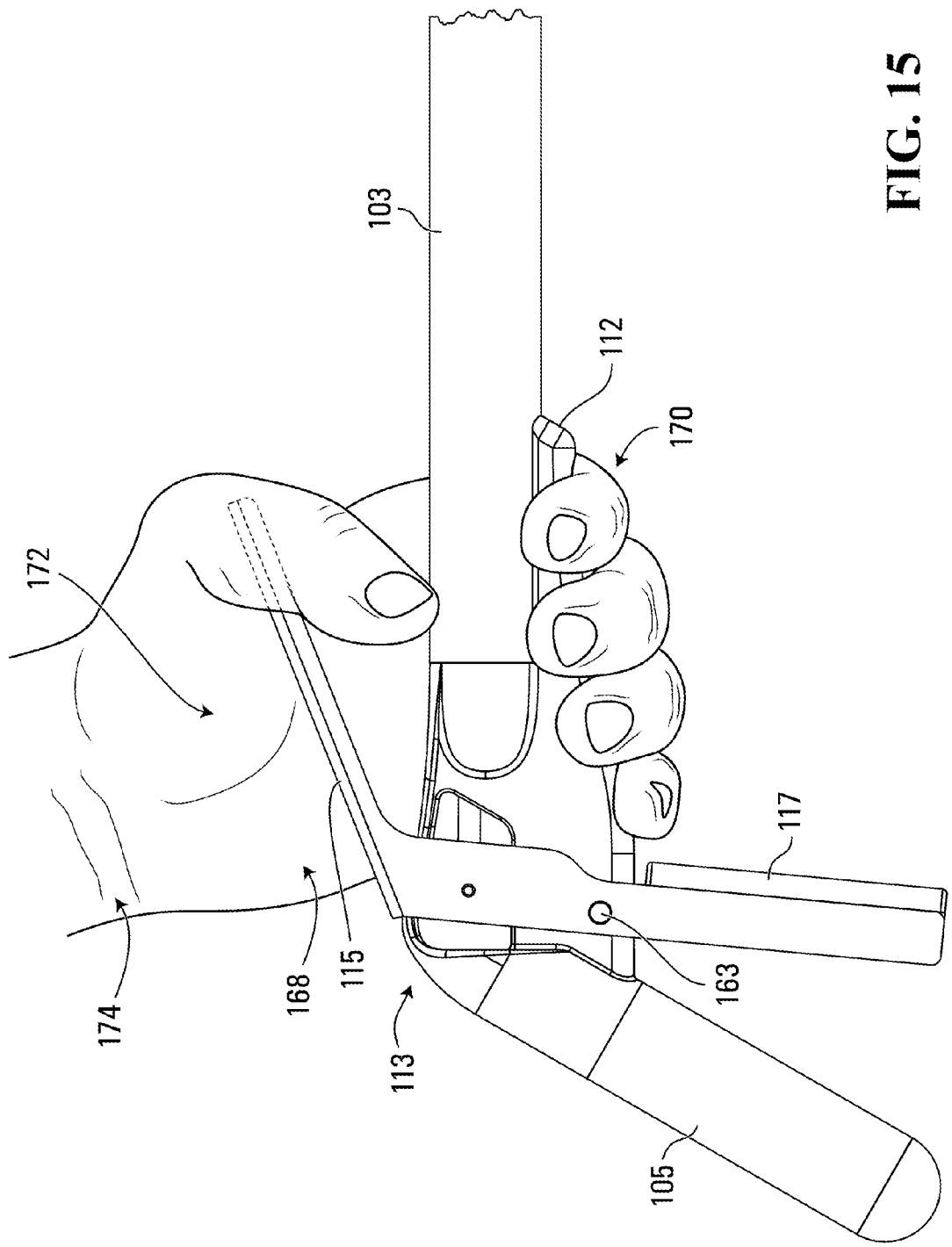
FIG. 15 illustrates operation of one of the handles of the reaching device of FIG. 8.
Figure 16:
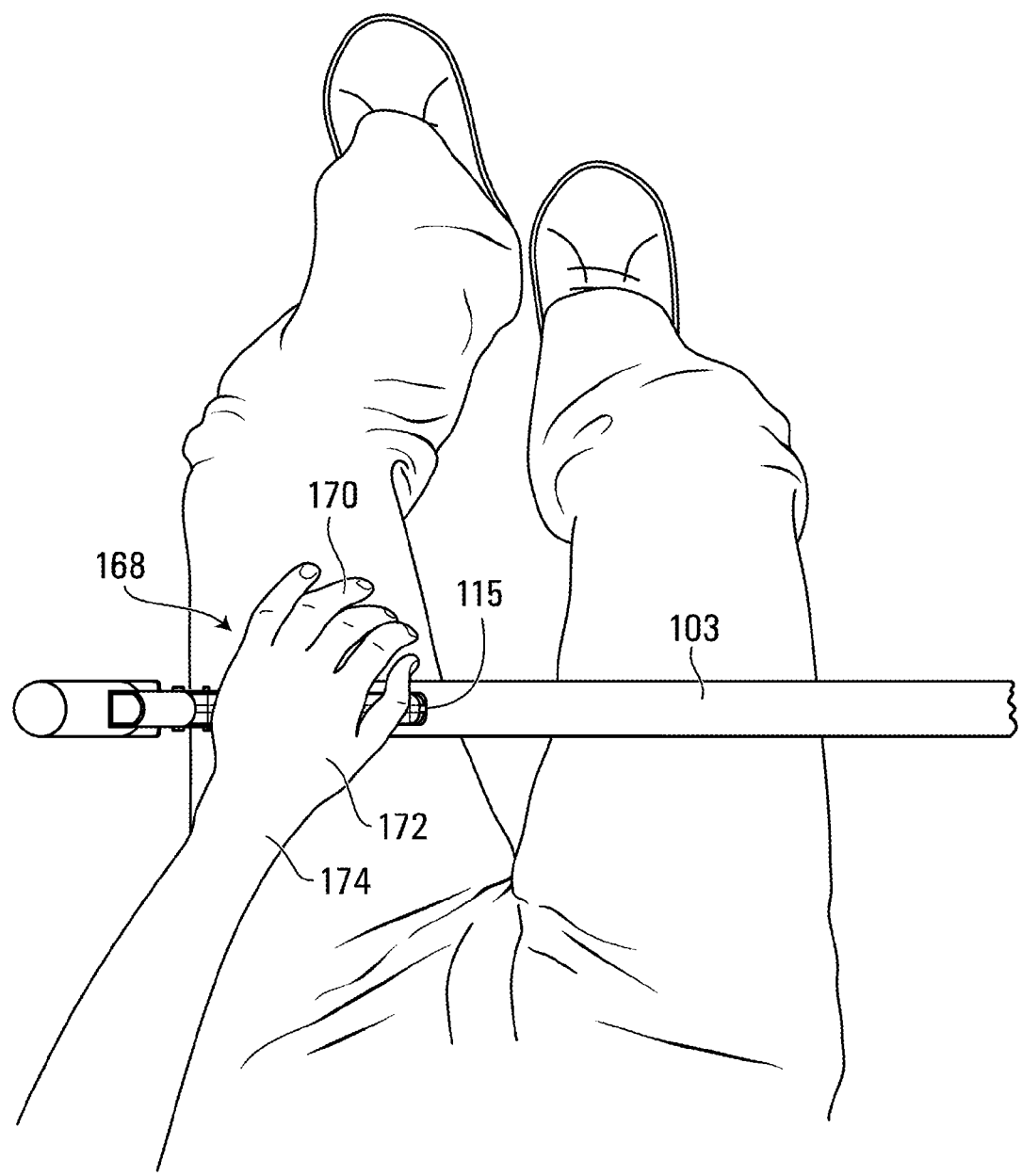
FIG. 16 illustrates an alternative way for operating the handle of FIG. 15.

Use of the handle 115 is described with reference to FIGS. 15 and 16. A first way of operating the handle 115 is shown in FIG. 15. To open the jaw 106, the mail carrier squeezes the handle 115 in the manner shown in FIG. 15. Specifically, the fingers 170 of the left hand 168 of the mail carrier wrap under the shaft 103 and onto the gripping surface 112, and the heel 172 of the hand pushes the handle 115 towards the shaft 103 and the fingers 170 to squeeze the handle 115. By pushing the handle 115, the handle 115 is pivoted towards the shaft 103 and the fingers 170. Alternatively, as shown in FIG. 16, the mail carrier can instead rest the device 102 on his or her lap, extend his or her lower arm and left hand 168 substantially parallel to his or her thighs, and push down on the handle 115 with the heel 172 of the left hand 168. By pushing the handle 115, the handle 115 is pivoted towards the shaft 103.

By operating the handle 115 in the manner shown in FIG. 15 or FIG. 16, the position of the wrist 174, as well as the hand 168 as a whole, is ergonometric, allowing the mail carrier to comfortably squeeze the handle 115 and simultaneously load mail into the jaw 106 using the right hand (not shown).

Once the jaw 106 is opened and the mail is placed in the jaw 106, the left hand 168 releases the handle 115 to close the jaw 106. The mail is thus held between the holding members 108 and 110.

Figure 17:
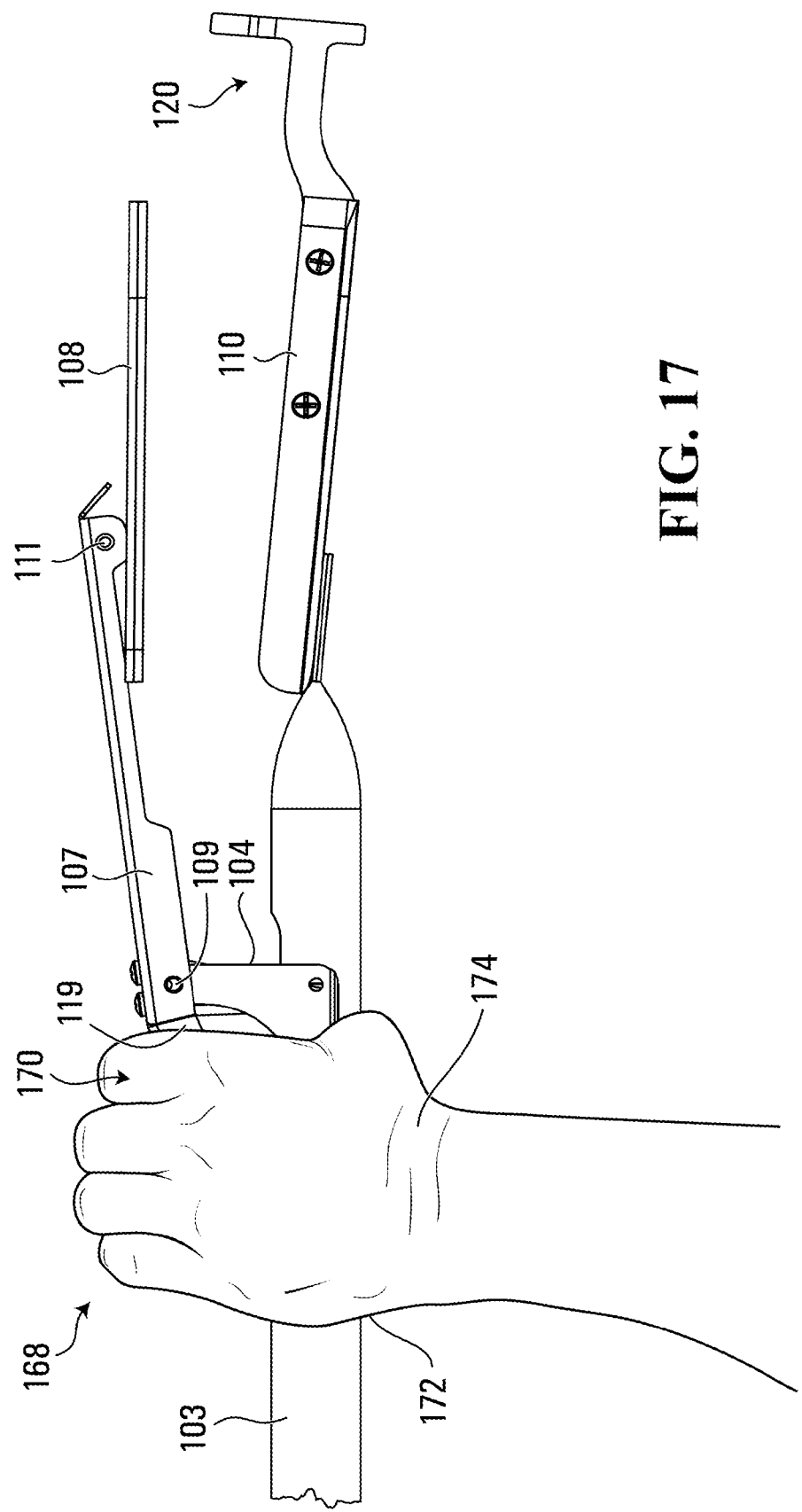
FIG. 17 illustrates operation of another of the handles of the reaching device of FIG. 8.

Use of the handle 119 is described with reference to FIG. 17. Either the left hand 168 or the right hand may be used to squeeze the handle 119. In the illustration in FIG. 17, the left hand 168 is used, since it is generally easier to use the right hand to load the mail into the jaw 106 while the left hand 168 squeezes a handle to open the jaw 106. Specifically, as shown in FIG. 17 the palm and fingers 170 of the left hand 168 of the mail carrier wrap around the handle 119, and the heel 172 of the hand 168 rests against the bottom of the shaft 103. The fingers 170 then squeeze the handle 119 by pivoting the handle 119 towards the shaft 103 and towards the heel 172 of the hand 168. The position of the wrist 174, as well as the hand 168 as a whole, is still ergonometric. Alternatively, the mail carrier can squeeze the handle 119 in the same manner as shown in FIG. 15 or FIG. 16. That is, the heel 172 of the hand 168 can be used to push the handle 119 toward the shaft 103.

Figure 18:
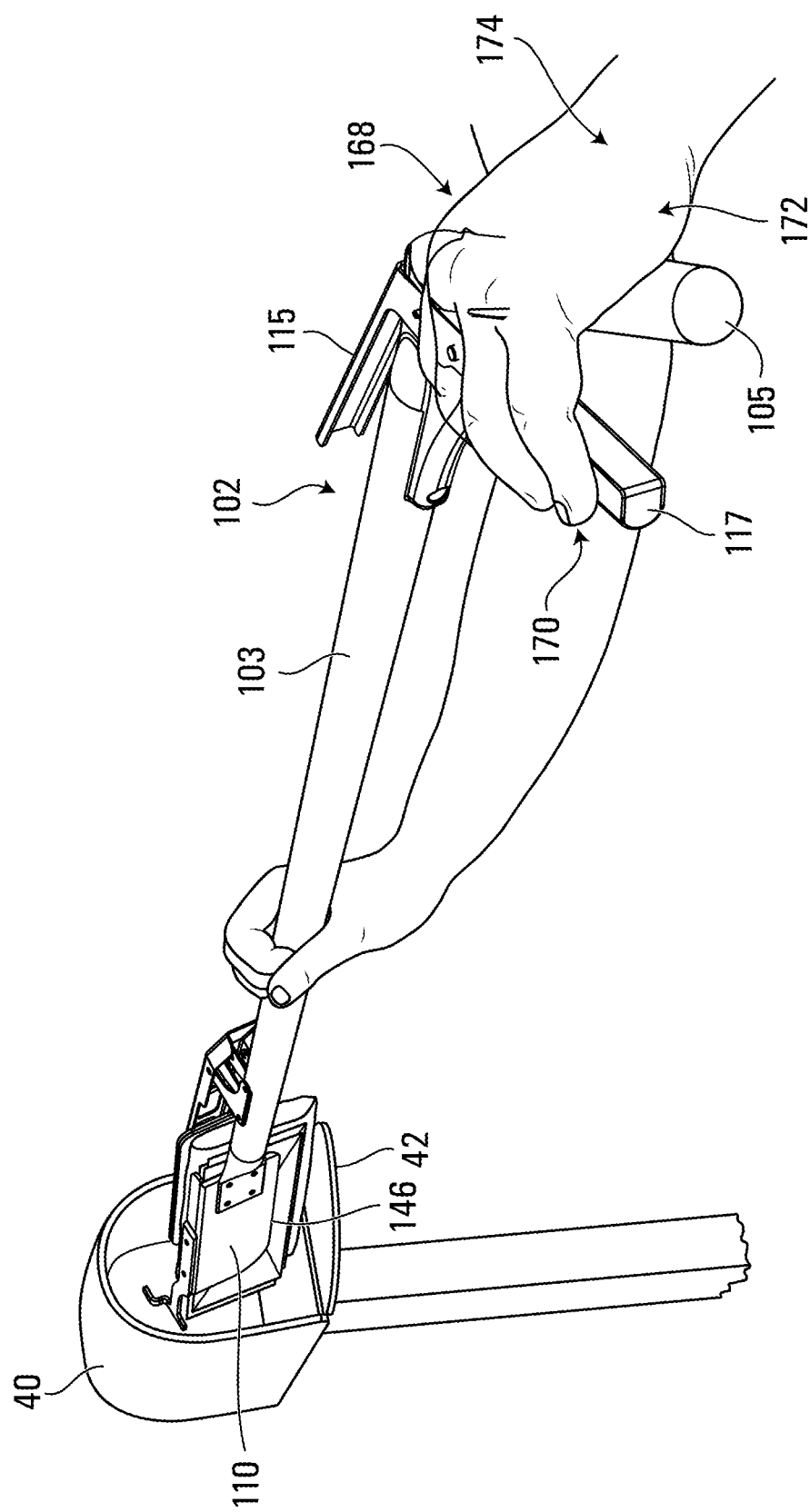
FIG. 18 illustrates use of the reaching device of FIG. 8 for placing mail into a mail box.

Once the mail has been successfully loaded into the jaw 106 of the device 102, the mail carrier then extends the device 102 through the passenger's window of the vehicle, inserts the jaw 106 of the device 102 into the mail box 40, and rotates or tips the device 102 so that the lateral tapered side edge 146 of the holding member 110 is pointing down towards the inside base of the mail box 40, as shown in FIG. 18. The mail carrier can then squeeze one of the handles 115 or 117 to open the jaw 106. Typically, the handle 117 is used since it is more ergonometric when the device 102 is rotated and in the position illustrated in FIG. 18. Once the jaw 106 is opened, the mail will slide out of the jaw 106 by the force of gravity. The vehicle (with passenger's window) is purposely omitted in FIG. 18 in order to clearly show the whole device 102, including the handles 115 and 117.

The use of two separate handles 115 and 117 allows for ergonometric handling by the mail carrier, both when loading mail and when releasing mail. As previously shown in FIGS. 15 and 16, when loading mail into the jaw 106, it is ergonometric for the left hand 168 of the mail carrier to squeeze handle 115. However, when the device 102 is rotated to release the mail into the mail box 40, as shown in FIG. 18, it becomes more awkward and less ergonometric to squeeze the handle 115 to open the jaw 106. Therefore, the mail carrier instead uses handle 117 to open the jaw 106 to release the mail. As shown in FIG. 18, the fingers 170 of the left hand 168 of the mail carrier wrap around the handle 117, and the heel 172 of the hand 168 rests against the outside of the fixed handle 105. The fingers 170 then squeeze the handle 117 by pivoting the handle 117 towards the heel 172 of the hand 168 and the fixed handle 105. The position of the wrist 174, as well as the hand 168 as a whole, is ergonometric, thereby allowing the mail carrier to comfortably squeeze the handle 117 when the device 102 is rotated to release the mail.

Once the mail has been safely placed inside of the mail box 40, the hooking member 120 can be used to close the cover 43 of the mail box 40, simply by pushing the cover 43 shut (not shown).

Figure 19:
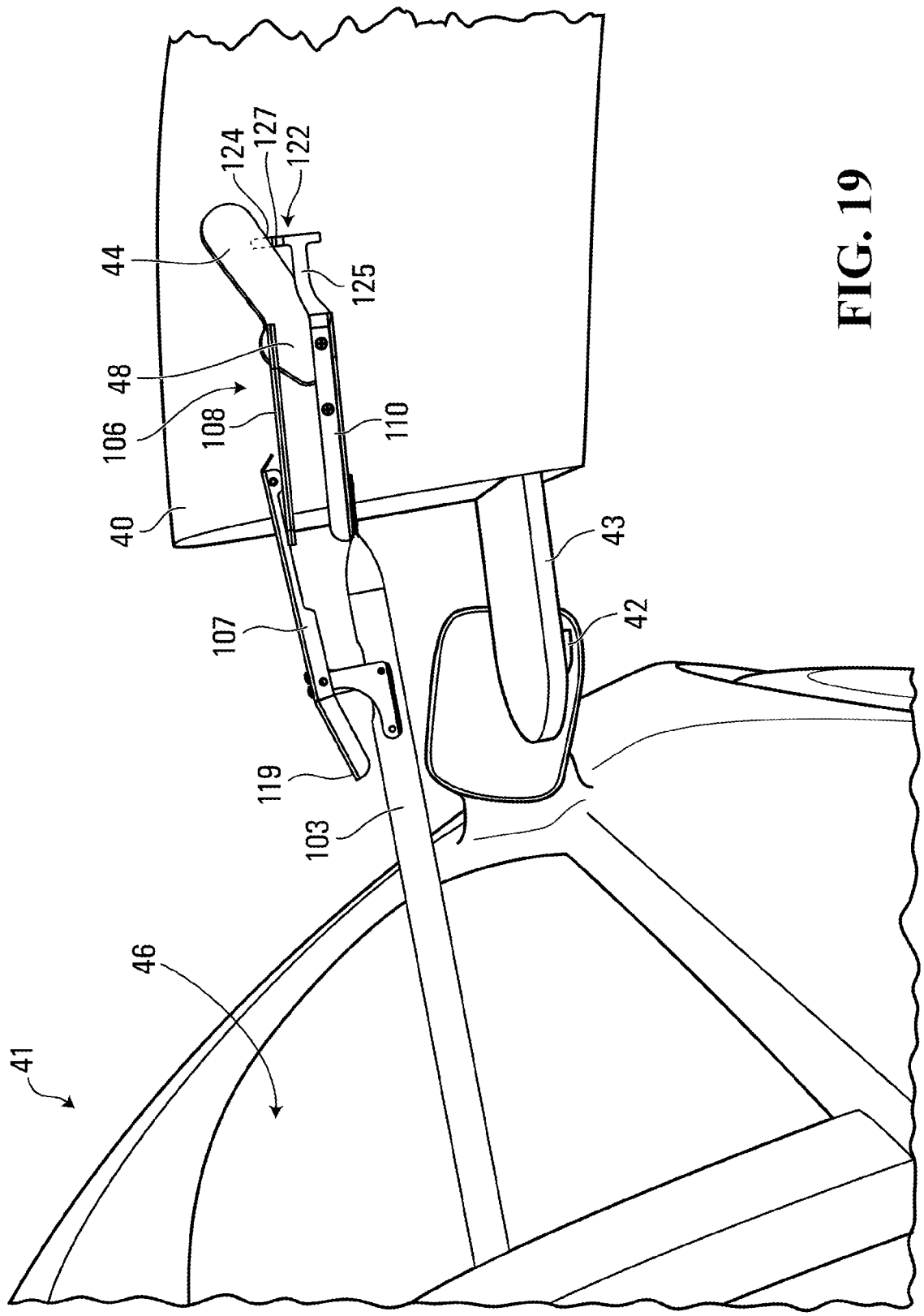
FIG. 19 illustrates use of the reaching device of FIG. 8 for raising an indicator flag on a mail box.

Turning now to FIG. 19, an indicator flag 44 is shown pivotally mounted to the side of the mail box 40 at the base 48 of the indicator flag 44. The indicator flag 44 is used to indicate the presence of mail.

As shown in FIG. 19, the upper portion 124 of the hooking member 120 can be used to engage the staff of the indicator flag 44. Specifically, the upper portion 124 is slid between the staff of the indicator flag 44 and the mail box 40, such that latching surface 127 abuts against the staff of the indicator flag 44. The clearance 123, explained earlier with reference to FIG. 10, provides the clearance necessary to facilitate easy latching onto the staff of the indicator flag 44. The clearance 123 also prevents the body 125 of the hooking portion 120 or the jaw 106 from interfering with the base 48 of the indicator flag 44.

The indicator flag 44 is typically on the right hand side of the mail box 40 when viewed from the perspective of the vehicle 41. Therefore, it is beneficial that the upper portion 124 is offset to the left. If the upper portion 124 were offset in the other direction instead, then it would be more awkward for the mail carrier to try and engage the staff of the indicator flag 44.

To lower the indicator flag 44, the mail carrier can push the indicator flag 44 down using a blunt end of the end portion 122 of the hooking member 120.

Alternatively, some rural mail boxes do not have an indicator flag, but instead can be rotated in a certain direction to indicate that there is mail in the mail box. The hook 120 may be used to rotate such a mail box.

Figure 20:
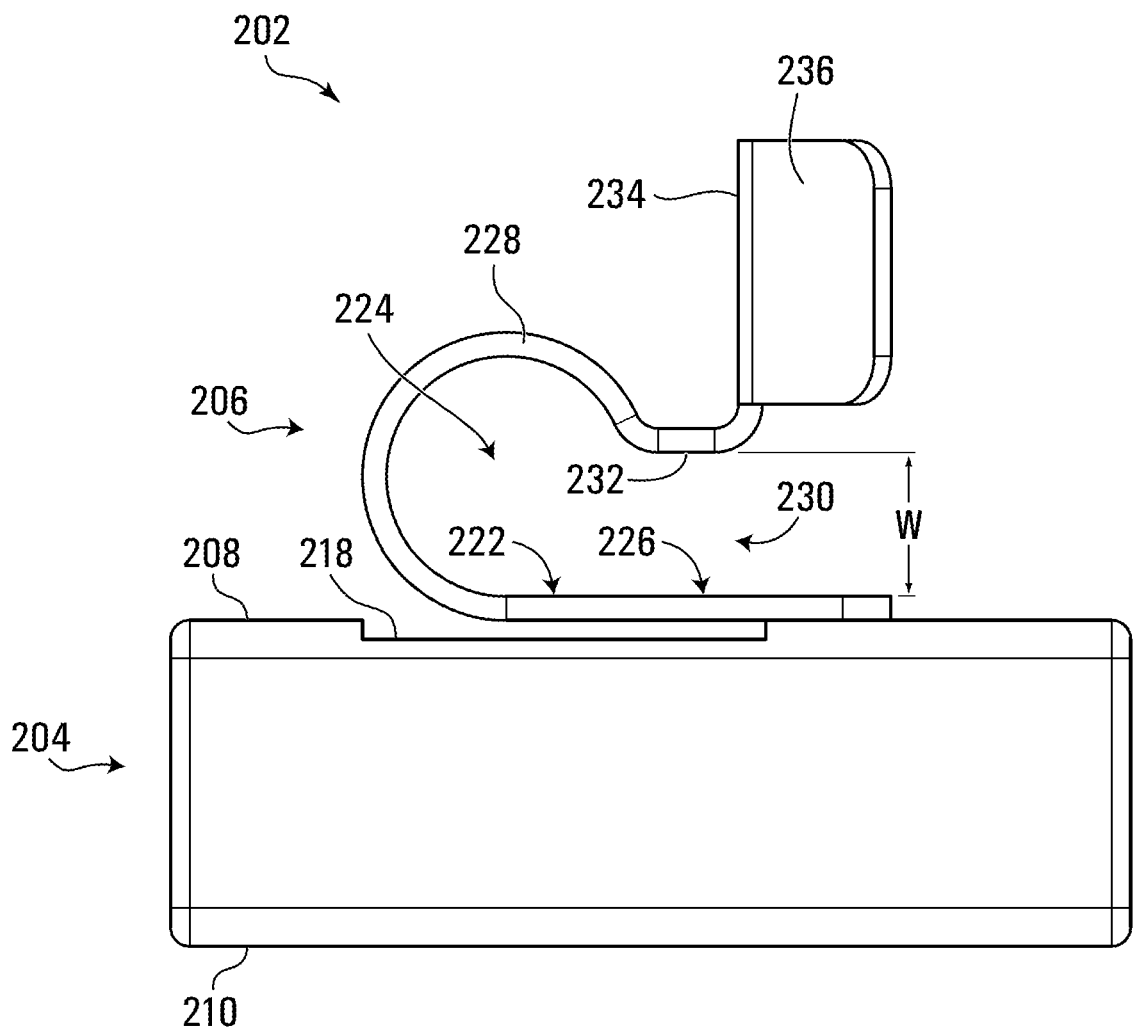
FIG. 20 is a side view of an embodiment of a complementary holder for the reaching device of FIG. 8.
Figure 21:
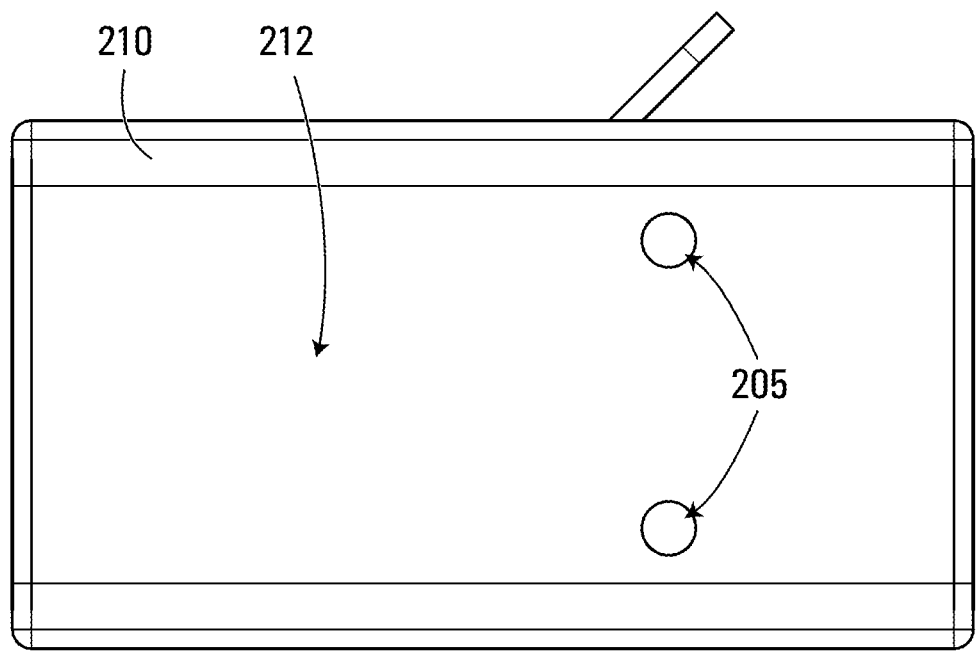
FIG. 21 illustrates the lower face of the complimentary holder of FIG. 20.
Figure 22:
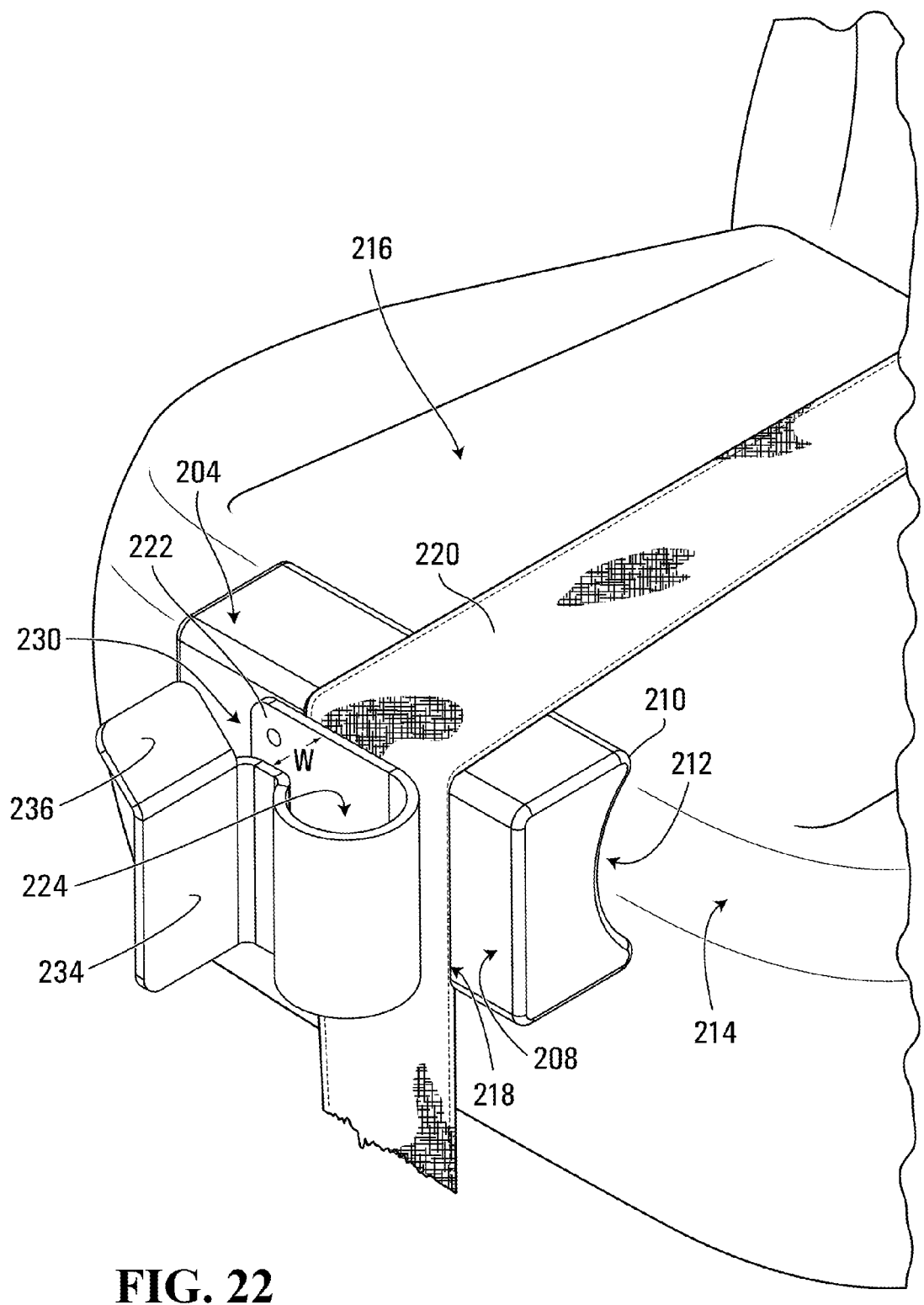
FIG. 22 illustrates the complimentary holder of FIG. 20 strapped to the front edge of a seat.

Turning now to FIGS. 20 to 22, an embodiment of a complimentary holder 202 for the reaching device 102 is illustrated. The holder 202 is for securely holding the reaching device 102 when not in use to prevent the reaching device 102 from freely moving around, for example, when the mail carrier is driving.

The holder 202 includes a body or base 204, and a holding portion 206 connected to and extending from the base 204. The holding portion 206 is for receiving and holding the elongated shaft 103 of the device 102, and the base 204 is for securing the holding portion 206 to an interior of the vehicle. The interior of the vehicle is illustrated in FIG. 22 and includes a passenger's seat 216, which has front edge 214.

In the illustrated embodiment, the base 204 is specifically for securing the holding portion 206 to the passenger's seat 216. Specifically, the base 204 comprises a body having an upper face 208 and a lower face 210. As is best shown in FIGS. 21 and 22, the lower face 210 has a channel 212 defined therein for receiving the front edge 214 of the passenger's seat 216. On the opposite upper face 208, a groove 218 is defined therein for receiving a strap 220. As is best shown in FIG. 22, the strap 220 is fed through groove 218, and the front edge 214 of the passenger's seat 216 is placed in the channel 212 so that the front edge 214 of the passenger's seat 216 abuts against the lower face 210 of the base 204. The strap 220 is then used to tie or secure the base 204 to the passenger's seat 216.

In the illustrated embodiment, the holding portion 206 is a projecting member projecting out from the upper face 208 of the base 204. The projecting member 206 includes a connecting portion 222 that is fixedly connected to the upper face 208 of the base 204. For example, the connecting portion 222 can be connected to the base 204 using fasteners, such as screws or bolts (not shown), threaded or extending into apertures 205.

As is best illustrated in FIG. 20, the projecting member 206 bends away from the connecting portion 222 and then bends back towards the upper face 208 to define a cup 224. The connecting portion 222 forms the bottom 226 of the cup 224, and the top 228 of the cup 224 bends towards the upper face 208 to define an entrance 230 to the cup 224. The entrance 230 has a width W. The width W is less than the diameter of the elongated shaft 103 of the reaching device 102.

The cup 224 is comprised of a resilient material that is moveable to expand the width W of the entrance 230 of the cup to allow the shaft 103 to pass therethrough when a large enough force is applied. Therefore, the elongated shaft 103 can be snapped into and out of the cup 224 by forcing the elongated shaft 103 through the entrance 230 of the cup 224, causing the top 228 to resiliently move away from the upper face 208 and expand the width W of the entrance 230 just enough to let the elongated shaft 103 pass through. When the shaft 103 is snapped into the cup 224, it will remain secured therein and will only be released when a force is applied (for example by the mail carrier) that is strong enough to expand the entrance 230 and let the shaft 103 pass therethrough. The top 228 of the cup 224 includes a substantially flat surface 232 substantially parallel to the upper face 208. It is this surface 232 that is engaged by the shaft 103 and pushed by the shaft 103 to resiliently move the top 228 of the cup 224 away from the upper face 208 to provide the snap-in and snap-out functionality.

In the illustrated embodiment, the top 228 of the cup 224 has a flange 234 extending therefrom, which extends both away from and substantially perpendicular to the upper face 208 of the base 204. The flange 234 includes a wing 236. The wing 236 extends at a non-zero angle from the flange 234 in the same direction in which the cup 224 opens. The flange 234 and wing 236 act as a guide, helping to guide the shaft 103 into the cup 224.

With the provision of the holder 202, when the reaching device 102 is not being used, it can be securely held in the passenger's side of the vehicle by snapping the shaft 103 of the device 102 into the cup 224 of the holder 202 via the entrance 230. When the reaching device 102 is needed, the mail carrier can simply snap the shaft 103 back out of the holder 202 via the entrance 230.

Figure 23:
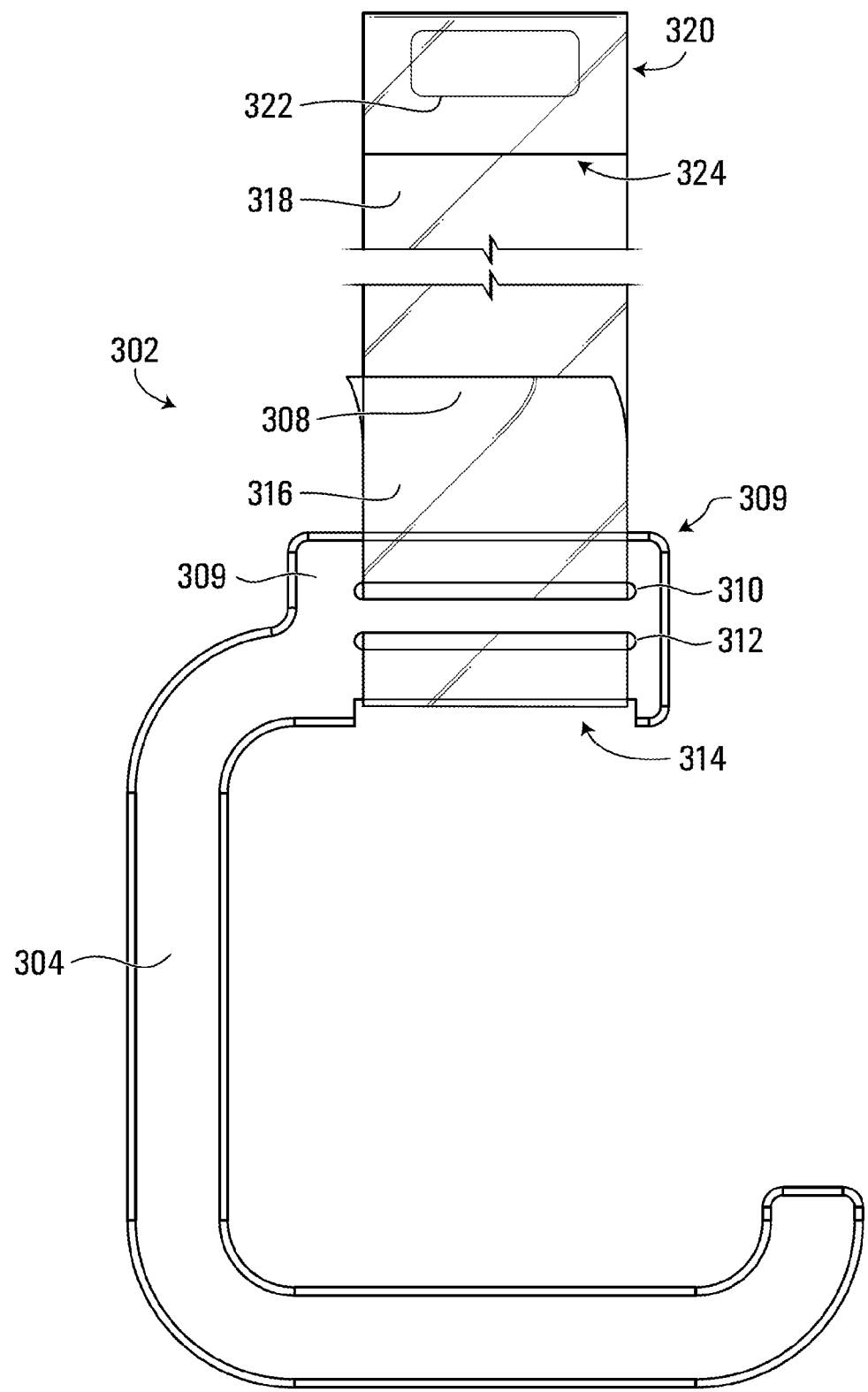
FIG. 23 is a front view of a complimentary support for the reaching device of FIG. 8.
Figure 24:
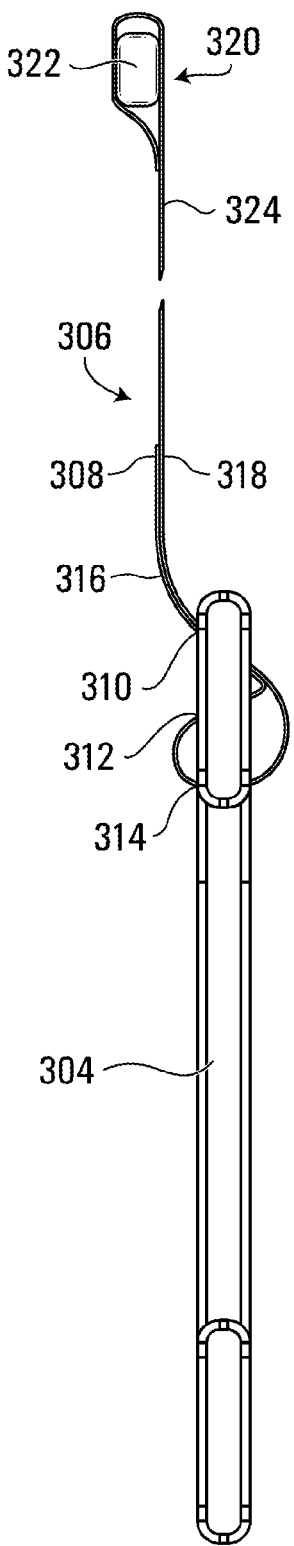
FIG. 24 is a side view of the support of FIG. 23.

Turning now to FIGS. 23 to 25, an embodiment of a complimentary support 302 is also provided for supporting the device 102 when it is extended through the passenger's window of a vehicle.

The support 302 comprises a hook 304 and a translucent strap 306 for hanging the hook 304 from the passenger's window. The strap 306 is adjustable to adjust the position of the hook 304 in the passenger's window. In the illustrated embodiment, this adjustability is achieved as follows. The base 309 of the hook 304 includes a top slot 310, a bottom slot 312, and a channel 314. As is best shown in FIG. 24, one end 308 of the strap 306 is fed through the top slot 310, then through the channel 314, then through the bottom slot 312, and then back through the top slot 310. Thus, when the strap 306 is fed through as described, the strap 306 has a loose portion 316, i.e., the portion of loose strap 316 between the end 308 and the top slot 310, as well as a hanging portion 318, i.e. the portion of the strap 306 hanging down from the top of the passenger's window. By adjusting the length of loose strap 316 between the end 308 of the strap 306 and the top slot 310, the length of the hanging portion 318 is adjusted.

At the other end of the strap 306, opposite end 308, is a connector 320 for connecting the strap 306 to the vehicle. In the illustrated embodiment, the connector 320 comprises a stop 322. The stop 322 is fitted between the inside top of the door and the body of the vehicle.

FIG. 25 illustrates use of the support 302. Specifically, FIG. 25 illustrates a vehicle 41 having a body 50, a passenger's door 47, and a passenger's window 46. When the door 47 is closed, it forms a seal with the body 50 of the vehicle 41. For example, as illustrated, the top 49 of the door 47 abuts against the body 50 of the vehicle 41.

To attach the support 302 to the vehicle 41, the stop 322 can be placed against the rubber gasket (not shown) of the inside edge of the door 47 when the door 47 is open (not shown), and then the door 47 can be shut to secure the stop 322 between the door 47 and the body 50 of the vehicle 41. The strap 306 can then be adjusted so that it hangs down the desired length and into the passenger's window 46. Alternatively, the portion 324 of the strap 306 adjacent the stop 322 can instead be secured between the inside top 49 of the door 47 and the body 50 of the vehicle 41 so that the stop 322 hangs out the exterior of the vehicle 41 (not shown). The strap 306 can then be adjusted so that it hangs down the desired length and into the passenger's window 46. The strap 306 is made of a flexible but robust material to allow it to withstand the pressure of being secured between the door 47 and the body 50 of the vehicle 41.

As shown in FIG. 25, during use the shaft 103 of the device 102 is supported in hook 304 whenever the device 102 is extended through the passenger's window 46. The hook 304 supports part of the weight of the device 102, thereby making it easier for the mail carrier to manipulate the device 102 when it is extended through the window 46, for example, when the mail carrier is servicing a mail box.

The hook 304 and the strap 306 can be supplied individually or together in the form of a kit. The mail carrier typically constructs the support 302 from the individual hook 304 and strap 306 portions by threading the strap 306 through the slots of the hook 304 in the manner described above with reference to FIG. 24.

It will be appreciated that the complimentary holder 202 and/or support 302 could instead be used with the reaching device 2 described earlier with respect to FIGS. 1 to 7. Additionally, a kit may be provided including all or some of the following components: the holder 202, the support 302, and the reaching device 102 (or alternatively the reaching device 2). It will also be appreciated that the holder 202 and support 302 are optional.

FIGS. 1 to 19 describe in detail two particular embodiments of a reaching device. However, it will be appreciated that various modifications will be apparent to those skilled in the art without departing from the scope of the claims appended hereto. A few of these modifications are described below.

In the embodiment illustrated in FIGS. 1 to 7, the arm 7 of the jaw 6 is mounted on the side 30 of the shaft 3, such that the flexible member 14 is laterally offset from the shaft 3. Alternatively, in other embodiments, the arm 7 may instead be connected underneath the shaft 3, with the lips 8 and 10 also centered beneath the shaft 3. The flexible member 14 will still perform the functionality described herein. Thus, it will be appreciated that the exact positioning of the jaw 6 and flexible member 14 can vary while still performing the functionality of the flexible member 14 described herein.

The embodiments illustrated in the figures use one or more handles for opening and closing the jaw. It will be appreciated that the handle(s) can instead be replaced with any actuator for triggering the opening and closing of the jaw 6 or 106. As one example, a handle may be replaced with a sliding peg that controls the opening and closing of the jaw by sliding the peg towards and away from the jaw. As another example, the handle may be replaced with a button that is pushed to open the jaw.

The embodiment illustrated in FIGS. 1 to 7 employs an elastic strip specifically interconnected between the lower lip 10 and a fixed arm 16 extending outward from the shaft 3. However, more generally, any type of flexible member (not necessarily elastic or a strip) can be utilized, for example, a flexible arm, a flexible tube or a flexible sheet. Moreover, the exact interconnection of the flexible member 14 in the illustrated embodiment can be modified as desired, so long as the flexible member moves as the jaw 6 opens to assist ejection of an item from the jaw 6. For example, in an alternative embodiment, the jaw may instead comprise two movable arms pivotally connected to the shaft. The two movable arms move towards each other to close the jaw and move away from each other to open the jaw. The flexible member can be interconnected between these two moving arms and move as the jaw opens to assist ejection of the item from the jaw.

The embodiments illustrated utilize a jaw having one fixed arm and one arm that can be pivoted to open and close the jaw. In an alternative embodiment, the jaw may instead comprise two movable arms, each pivotally connected to the shaft. Additionally, the embodiments illustrated provide two examples of holding members: lips and planar surfaces. It will be appreciated that other holding members may be used instead. Other examples of holding members include scoops and adhesive surfaces.

The jaw 106 in the embodiment illustrated in FIGS. 8 to 19 includes a stop 150. In the illustrated embodiment, the stop 150 is an abutment surface projecting up from one of the holding members. It will be appreciated that the specific stop 150 illustrated can be replaced with other structures that perform an equivalent function. For example, the stop may instead comprise a frictional surface that stops or slows down the item when it is being slid into the jaw.

The illustrated embodiments describe in detail examples of projecting members for opening and closing mail box covers, for example, projecting portion 18, hook 20, and hooking member 120. However, it will be appreciated that other projecting members for opening and closing mail boxes can be substituted without affecting the functionality of the jaw 6 or jaw 106 described herein. The exact design of the projecting member will depend upon the mail boxes being serviced. More generally, a projecting member may not even be necessary depending on the type of mail box (e.g. a mail slot without a cover or a mail box that can be opened in another manner).

The holder 202 illustrated abuts against the front edge of the passenger's seat. It will be appreciated that the holder 202 can instead be attached to the passenger's seat, or to any other place in the interior of the vehicle, using other known fastening mechanisms, such as glue, screws, etc. Additionally, the cup 224 is only one example of a way in which the shaft of the reaching device can be securely held. As another example, a pair of arms may instead be used to hold the shaft. It will also be appreciated that a guide for guiding the shaft of the device into the holder, such as the flange 234 and wing 236 of the holder 202, is optional.

The specific support 302 illustrated is only one example of a way in which the reaching device can be supported while being extended through the passenger's window. As an alternative, for example, the support may be a hook detachably fastened to the edge of the window.

Finally, even though the illustrated embodiments include a combination of mechanisms allowing for full service of a mail box (e.g. one or more projecting members for opening and closing the mail box and moving the indicator flag, a flexible member for assisting in ejecting an item into the mail box, a jaw with holding members for retrieving mail from the mail box and placing mail into the mail box), it will be appreciated that each one of these mechanisms has advantages in and of itself, and that embodiments of reaching devices are contemplated in which only some of these mechanisms are present. For example, in an alternative embodiment not illustrated, no projecting members are present.

Thus, various modifications will be apparent to those skilled in the art without departing from the scope of the claims appended hereto.

As a final point, it will be appreciated that in some embodiments the reaching device may be shipped partially assembled, with the user completing assembly before use. As one example, the flexible member 14 may be removable and connected to the jaw 6 by the operator just prior to use of the reaching device. In view of this, in some embodiments a kit is provided in which the kit comprises at least some of the parts for assembling the reaching devices disclosed herein.

Various embodiments will now be summarized.

In one embodiment, there is provided reaching device comprising: an elongated member extending between a first end and a second end; a jaw at the first end; a first actuator spaced from the jaw, and a second actuator at the second end; each one of the first actuator and the second actuator for opening and closing the jaw.

In some embodiments, the first actuator may also be at the second end. In some embodiments, the first actuator may be offset from the second actuator. In some embodiments, the first actuator may comprise a first handle moveable to open and close the jaw, and the second actuator may comprise a second handle moveable to open and close the jaw. In such embodiments, the first handle may extend at a non-zero angle from the second handle, the first handle may be connected to the second handle, and/or the first handle may be integrally formed with the second handle. Also, the first handle and the second handle may pivot together around a common axis. In some embodiments, the first handle may be for movement by a heel of a hand toward the device, and the second handle may be for movement by fingers of the hand towards the device. In some embodiments, the first handle may be pivotable towards the elongated member to open the jaw, and the second handle may be pivotable away from the elongated member to open the jaw. In some embodiments, the first handle may be pivotable towards the elongated member to open the jaw, and the second handle may be pivotable towards a fixed handle to open the jaw. In some embodiments, the first handle may overlie the elongated member, and the second handle may extend away from the elongated member.

In some embodiments, the reaching device may further comprise a third actuator for opening and closing the jaw. In such embodiments, the third actuator may be spaced from the first actuator and the second actuator. In some embodiments, the third actuator may be a lever connected to a pivotable arm of the jaw, the movement of the lever causing pivoting of the arm of the jaw.

In another embodiment, there is provided a reaching device comprising: an elongated member extending between a first end and a second end; a jaw at the first end; an actuator for opening and closing the jaw at the second end; the jaw including a pair of holding members, one of the holding members having a tapered lateral side edge.

In some embodiments, the reaching device may further comprise a hooking member projecting from the reaching device. In such embodiments, the hooking member may comprise a body and an end portion, the end portion extending from the body at a non-zero angle from the body. In some embodiments, the end portion may be substantially perpendicular to the body. In some embodiments, the body may be connected to one of the holding members, and the body may extend in front of the elongated member in a longitudinal direction of the elongated member. In some embodiments, the end portion may have an offset portion. The offset portion may be offset away from at least one of the holding members and/or the offset portion may form a latching surface. In some embodiments, the end portion may comprise two hooking portions at opposite ends of the end portion. In some embodiments, the body may include a recess. In some embodiments, the hooking member facilitates opening of a mail box.

In some embodiments, the holding member having the tapered lateral side edge may further comprise a tapered end edge. In some embodiments, each holding member of the pair of holding members may comprise a holding surface, each holding surface having a substantially planar portion. In such embodiments, the holding surface of at least one of the holding members may be frictional.

In some embodiments, the jaw may further comprise a stop. In such embodiments, the stop may be connected to the holding member having the tapered lateral side edge, opposite the tapered lateral side edge. In some embodiments, the stop may be an abutment surface that projects substantially perpendicular to the holding member having the tapered lateral side edge.

In some embodiments, the holding member having the tapered lateral side edge may be fixed to the elongated member, and the other holding member may be pivotally connected to the elongated member.

In some embodiments, the actuator is a first actuator, and the reaching device further comprises a second actuator spaced from the jaw, the second actuator also for opening and closing the jaw. In such embodiments, the second actuator may also be at the second end, and the first actuator may be offset from the second actuator. In some embodiments, the first actuator may comprise a first handle moveable to open and close the jaw, and the second actuator may comprise a second handle moveable to open and close the jaw. In some embodiments, the first handle may extend at a non-zero angle from the second handle. In some embodiments, the first handle may be connected to the second handle. In some embodiments, the first handle may be integrally formed with the second handle. In some embodiments, the first handle and the second handle may pivot together around a common axis. In some embodiments, the first handle may be for movement by a heel of a hand toward the device, and the second handle may be for movement by fingers of the hand towards the device. In some embodiments, the first handle may be pivotable towards the elongated member to open the jaw, and the second handle may be pivotable away from the elongated member to open the jaw. In some embodiments, the first handle may be pivotable towards the elongated member to open the jaw, and the second handle may be pivotable towards a fixed handle to open the jaw. In some embodiments, the first handle may overlie the elongated member and the second handle may extend away from the elongated member.

In some embodiments, the reaching device may further comprise a third actuator for opening and closing the jaw. In such embodiments, the third actuator may be spaced from the first actuator and the second actuator. In some embodiments, the third actuator may be a lever connected to a pivotable arm of the jaw, the movement of the lever causing pivoting of the arm of the jaw.

In some embodiments, the tapered lateral side edge may be for sliding under an item.

In some embodiments, the jaw may be biased to be closed.

In another embodiment, there is provided a kit comprising: any one of the reaching devices described above; and at least one of: (i) a holder for holding the reaching device; and (ii) a support for hanging in a window, the support for supporting the reaching device.

In another embodiment, there is provided a holder comprising a body having a holding portion extending from the body; the holding portion for receiving a shaft of a reaching device, and the body for securing the holding portion to an interior of a vehicle. In some embodiments, the body may have an upper face and a lower face; the holding portion extending from the upper face, and the lower face having a channel defined therein for receiving a front edge of the seat. In some embodiments, the holding portion may comprise a projecting member having a cup for receiving the shaft.

In another embodiment, there is provided a support comprising a hook for supporting a shaft of a reaching device, and a strap for hanging the hook in a window.

In another embodiment, there is provided a reaching device comprising: an elongated member; a jaw including an arm pivotally connected to the elongated member; an actuator for opening and closing the jaw; and a flexible member connected to the jaw; the opening of the jaw causing movement of the flexible member to assist ejection of an item from the jaw.

In some embodiments, the flexible member may be in a relaxed position when the jaw is closed, and said opening of the jaw may cause movement of the flexible member from the relaxed position to assist the ejection. In some embodiments, the flexible member may be interposed between the arm of the jaw and the elongated member. In some embodiments, the flexible member may be interconnected between the arm of the jaw and the elongated member. In some embodiments, the flexible member may be connected to the arm of the jaw at one end of the flexible member and to the elongated member at the other end of the flexible member. The actuator may pivot the arm to open and close the jaw.

In some embodiments, the flexible member may be taut when the jaw is open, and wherein when the jaw is closed the flexible member in the relaxed position may be curved to receive an end of the item in the hollow of the curve. In some embodiments, when the jaw is closed the flexible member in the relaxed position may be cupped. In some embodiments, the flexible member may be for receiving the end of the item against the flexible member when in the relaxed position.

In some embodiments, the jaw and the actuator may be at opposite ends of the elongated member. In some embodiments, the flexible member may be elastic. In such embodiments, the flexible member may be an elastic strip.

In some embodiments, the elongated member may comprise an elongated shaft. In some embodiments, the flexible member may be laterally offset from the elongated member. In some embodiments, the elongated member may comprise a fixed arm extending outward from the elongated member, and wherein said other end of the flexible member may be connected to the fixed arm.

In some embodiments, the elongated member may comprise a fixed arm connected thereto and extending substantially perpendicular to a longitudinal axis of the elongated member, and wherein said other end of the flexible member may be connected to the fixed arm. In some embodiments, the fixed arm may be adjacent to where the arm of the jaw pivotally connects to the elongated member.

In some embodiments, the arm of the jaw may comprise a lower lip, and wherein said one end of the flexible member may be connected to the lower lip. In such embodiments, the lower lip may include a tapered end portion for sliding under the item. In some embodiments, the tapered end portion may be flexible. In some embodiments, the reaching device may further comprise an upper lip connected to the elongated member and extending substantially perpendicular to the longitudinal axis of the elongated member; wherein the lower lip moves towards the upper lip when the arm pivots to close the jaw; the upper lip and the lower lip for holding the item therebetween when the jaw is closed. In such embodiments, at least one of the lower lip and the upper lip may have a frictional surface for assisting in holding the item. In some embodiment, the reaching device may further comprise a projecting portion extending substantially perpendicular to the upper lip to facilitate opening a mail box. In such embodiments, the projecting portion may be integrally formed with the upper lip.

In some embodiments, the reaching device may further comprise a hooking member projecting outward from the elongated member to facilitate opening a mail box.

In some embodiments, the hooking member may further comprise a hook projecting outward from the elongated member in a longitudinal direction of the elongated member and bending in a direction substantially perpendicular to the longitudinal axis of the elongated member. In some embodiments, the end of the hook may comprise a notch. In some embodiments, the hook may bend in a direction opposite the direction in which the upper lip extends. In some embodiments, the hook may bend substantially to the left when viewed from behind the hook.

In some embodiments, the reaching device may further comprise a projecting member for opening a mail box. In such embodiments, the projecting member may be a projecting portion extending substantially perpendicular to a longitudinal axis of the elongated member. In some embodiments, the projecting member may be a hook projecting outward from the elongated member in a longitudinal direction of the elongated member and bending in a direction substantially perpendicular to the longitudinal axis of the elongated member. In some embodiments, an end of the hook may comprise a notch.

In some embodiments, the arm of the jaw may be attached to one side of the elongated member.

In some embodiments, the actuator may be a handle. In such embodiments, the reaching device may further comprise a bar extending between the handle and the arm of the jaw; the bar movable by the handle to pivot the arm of the jaw. In some embodiments, the reaching device may further comprise a spring interposed between the handle and the elongated member to bias the handle to a position in which the handle opens the jaw.

In some embodiments, the item may be mail.

Finally, in another embodiment, a kit may be provided for assembling any of the reaching device embodiments described above.

The invention claimed is:
1. A reaching device comprising:
an elongated member extending between a first end and a second end;
a jaw at the first end;
a first actuator spaced from the jaw, and a second actuator at the second end;

each one of the first actuator and the second actuator for opening and closing the jaw;

wherein the first actuator comprises a first handle moveable to open and close the jaw, and the second actuator comprises a second handle moveable to open and close the jaw;

and wherein the first handle and the second handle pivot together around a common axis.

2. The reaching device of claim 1 wherein the first handle is pivotable towards the elongated member to open the jaw, and wherein the second handle is pivotable towards a fixed handle to open the jaw.

3. The reaching device of claim 1 wherein the first handle overlies the elongated member and the second handle extends away from the elongated member.

4. The reaching device of claim 1 further comprising a third actuator for opening and closing the jaw, wherein the third actuator is spaced from the first actuator and the second actuator, and wherein the third actuator is a lever connected to a pivotable arm of the jaw, the movement of the lever causing pivoting of the arm of the jaw.

5. The reaching device of claim 1 further comprising a hooking member projecting from the reaching device, wherein the hooking member comprises a body and an end portion, the end portion extending from the body at a non-zero angle from the body.

6. The reaching device of claim 1 wherein the jaw comprises a pair of holding members, each holding member of the pair of holding members comprising a holding surface, each holding surface having a substantially planar portion, and one of the holding members having a tapered lateral side edge.

7. A reaching device comprising:
an elongated member extending between a first end and a second end;
a jaw at the first end;
an actuator for opening and closing the jaw at the second end;
the jaw including a pair of holding members, one of the holding members having a tapered lateral side edge;
wherein the actuator is a first actuator, and the reaching device further comprises a second actuator spaced from the jaw, the second actuator also for opening and closing the jaw; and wherein the jaw further comprises a stop connected to the jaw opposite the tapered lateral side edge, and wherein the stop is an abutment surface upstanding from the holding member having the tapered lateral side edge, opposite the tapered lateral side edge.

8. The reaching device of claim 7 wherein the first actuator comprises a first handle moveable to open and close the jaw, and the second actuator comprises a second handle moveable to open and close the jaw, and wherein the first handle extends at a non-zero angle from the second handle.

9. The reaching device of claim 7 further comprising a third actuator for opening and closing the jaw, wherein the third actuator is spaced from the first actuator and the second actuator, and wherein the third actuator is a lever connected to a pivotable arm of the jaw, the movement of the lever causing pivoting of the arm of the jaw.

10. The reaching device of claim 7 further comprising a hooking member projecting from the reaching device, wherein the hooking member comprises a body and an end portion, the end portion extending from the body at a non-zero angle from the body.

11. The reaching device of claim 10 wherein the hooking member facilitates opening of a mail box.

12. The reaching device of claim 7 wherein each holding member of the pair of holding members comprises a holding surface, each holding surface having a substantially planar portion, the substantially planar portions abutting against each other when the jaw is closed.

13. The reaching device of claim 12 wherein the stop is connected to the holding member having the tapered lateral side edge, opposite the tapered lateral side edge.

14. The reaching device of claim 12 wherein the tapered lateral side edge is for sliding under an item.

15. The reaching device of claim 7 wherein the holding member having the tapered lateral side edge has a substantially planar portion, and the tapered lateral side edge tapers from the substantially planar portion.

16. The reaching device of claim 7 wherein the holding member having the tapered lateral side edge also has a front edge that is tapered.

17. The reaching device of claim 7 further comprising a hooking member connected to the reaching device adjacent the stop and projecting from the reaching device in a direction away from the stop.

\* \* \* \* \*